(12) United States Patent
Tremblay et al.

(10) Patent No.: US 11,151,754 B1
(45) Date of Patent: Oct. 19, 2021

(54) METHODS AND SYSTEMS FOR GENERATING GRAPHICAL CONTENT THROUGH PHYSICAL SYSTEM MODELLING

(71) Applicant: COREL CORPORATION, Ottawa (CA)

(72) Inventors: Christopher Tremblay, Cantley (CA); Pascal Becheiraz, Gatineau (CA); Stephen Bolt, Stittsville (CA)

(73) Assignee: Corel Corporation, Ottawa (CA)

( * ) Notice: Subject to any disclaimer, the term of this patent is extended or adjusted under 35 U.S.C. 154(b) by 0 days.

(21) Appl. No.: 16/918,620

(22) Filed: Jul. 1, 2020

Related U.S. Application Data

(63) Continuation of application No. 16/050,215, filed on Jul. 31, 2018, now Pat. No. 10,740,929, which is a continuation of application No. 15/664,007, filed on Jul. 31, 2017, now Pat. No. 10,068,355, which is a continuation of application No. 14/822,966, filed on Aug. 11, 2015, now Pat. No. 9,824,464.

(60) Provisional application No. 62/035,538, filed on Aug. 11, 2014.

(51) Int. Cl.
| | |
|---|---|
| *G06T 11/00* | (2006.01) |
| *G06T 11/20* | (2006.01) |
| *G06T 15/00* | (2011.01) |
| *G06T 15/04* | (2011.01) |
| *G06T 5/00* | (2006.01) |

(52) U.S. Cl.
CPC .......... *G06T 11/001* (2013.01); *G06T 11/203* (2013.01); *G06T 5/001* (2013.01); *G06T 15/005* (2013.01); *G06T 15/04* (2013.01)

(58) Field of Classification Search
CPC ..... G06T 15/04; G06T 11/001; G06T 15/005; G06T 5/001; G06T 11/203
See application file for complete search history.

(56) References Cited

U.S. PATENT DOCUMENTS

| | | | |
|---|---|---|---|
| 5,500,925 A * | 3/1996 | Tolson | G06T 11/203 345/581 |
| 5,548,399 A | 8/1996 | Takai et al. | |
| 5,552,611 A | 9/1996 | Enichen | |
| 5,764,233 A | 6/1998 | Brinsmead et al. | |
| 5,777,619 A * | 7/1998 | Brinsmead | G06T 15/00 345/419 |
| 6,025,922 A | 2/2000 | Marsden | |

(Continued)

*Primary Examiner* — Abderrahim Merouan
(74) *Attorney, Agent, or Firm* — Rosenberg, Klein & Lee

(57) ABSTRACT

Graphic arts software has evolved to provide users with a variety of mark making tools to simulate different brushes, papers, and applied media such as ink, chalk, watercolour, spray paint and oils. However, in many instances the marks rendered appear unnatural and artificial despite the software's goal being to simulate as realistically. Accordingly, it would be beneficial to provide either users or the software application with a mechanism to remove or reduce artifacts indicative of artificial generation, e.g. rapid transitions. Further, in many instances the graphic images generated and/or manipulated refer to imagined environments or have elements that are physical in nature. Accordingly, it would be beneficial to provide users with a range of mark making tools that represent marks made by mark making tools comprising multiple elements following physical laws.

21 Claims, 24 Drawing Sheets

(56) References Cited

U.S. PATENT DOCUMENTS

| | | | |
|---|---|---|---|
| 6,348,924 B1* | 2/2002 | Brinsmead | G06T 11/001 345/441 |
| 6,870,550 B1 | 3/2005 | Schuster et al. | |
| 6,970,169 B1 | 11/2005 | Harris | |
| 7,170,523 B2 | 1/2007 | Suzuki | |
| 7,372,472 B1 | 5/2008 | Bordeleau et al. | |
| 7,948,485 B1* | 5/2011 | Larsen | G06T 13/60 345/420 |
| 8,000,947 B1 | 8/2011 | Qureshi et al. | |
| 8,952,393 B2 | 2/2015 | Wada et al. | |
| 8,952,939 B2 | 2/2015 | Lee | |
| 9,092,903 B2* | 7/2015 | Sumner | G06T 19/20 |
| 9,202,312 B1* | 12/2015 | Zingaretti | G06T 19/20 |
| 2002/0085734 A1 | 7/2002 | Keeney et al. | |
| 2003/0179203 A1 | 9/2003 | Bruderlin et al. | |
| 2004/0125103 A1* | 7/2004 | Kaufman | G06T 15/40 345/419 |
| 2005/0013964 A1 | 1/2005 | Van Brocklin et al. | |
| 2006/0274070 A1 | 12/2006 | Herman et al. | |
| 2008/0230705 A1* | 9/2008 | Rousso | A61B 5/417 250/363.04 |
| 2009/0006052 A1* | 1/2009 | Zhou | G06T 15/50 703/5 |
| 2009/0021552 A1 | 1/2009 | Fletcher et al. | |
| 2009/0304582 A1* | 12/2009 | Rousso | A61B 6/4258 424/1.61 |
| 2011/0246202 A1 | 10/2011 | McMillan et al. | |
| 2012/0106780 A1 | 5/2012 | Ellis | |
| 2012/0203364 A1 | 8/2012 | Redmann | |
| 2014/0193336 A1* | 7/2014 | Rousso | A61B 6/503 424/1.65 |
| 2014/0267223 A1* | 9/2014 | Sumner | G06T 19/20 345/419 |

\* cited by examiner

210

220

Airbrush Feature

Airbrush Flow

230

240

Grain

Impasto

250

260

Opacity

Size

310
Angle Hose

320
Angle

330
Colour Expression

340
Colour Variability
From Set

350
Colour Variability

360
Impasto Stroke

900D

900E

900F

900G

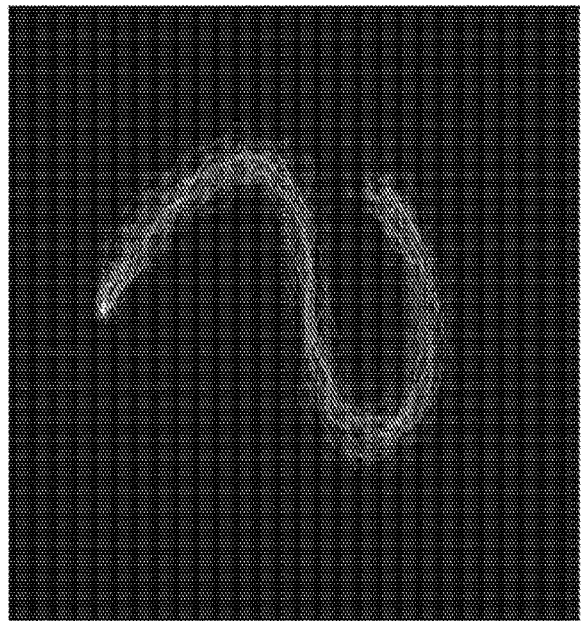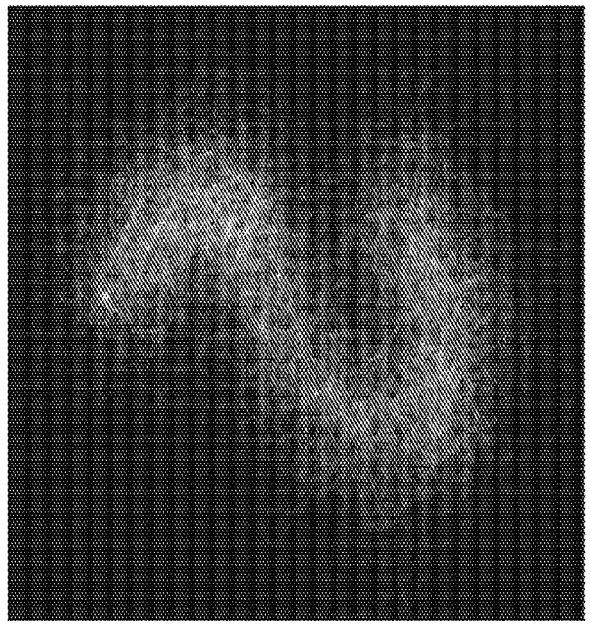
1800A  1800B
Figure 18
1800C  1800D
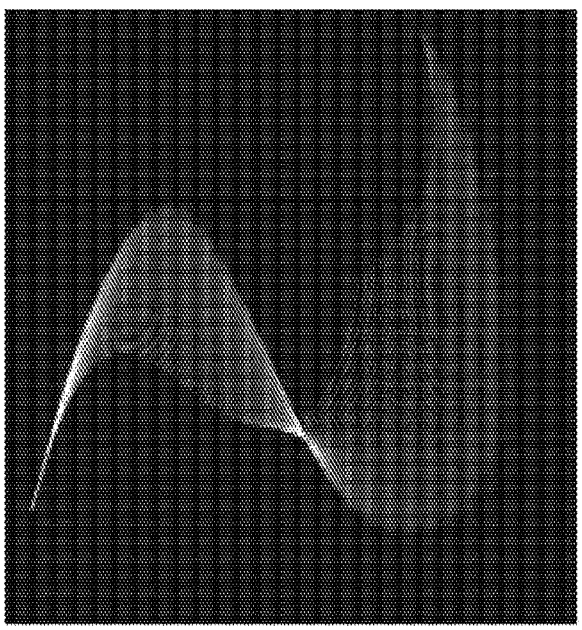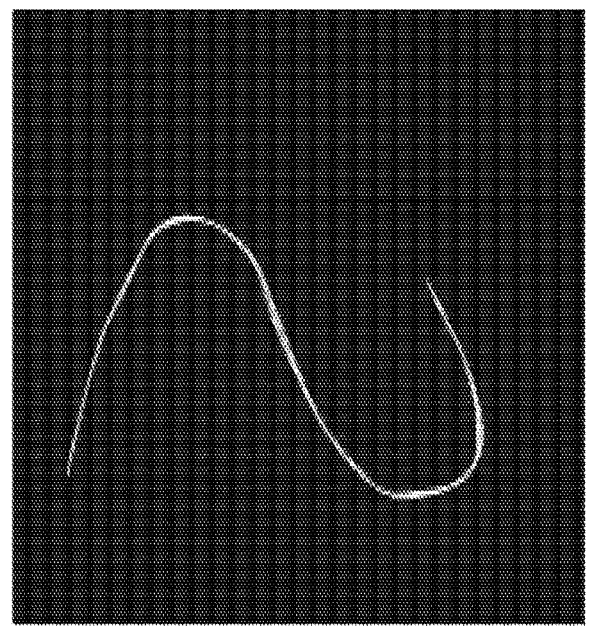

2110  2120  2130

2140  2150

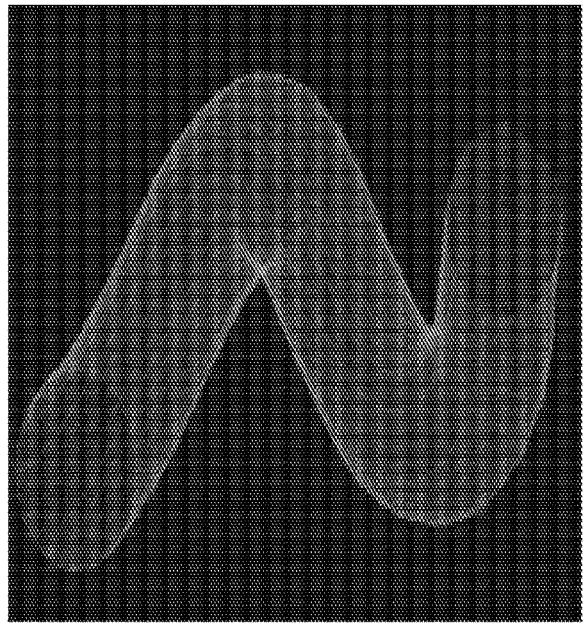 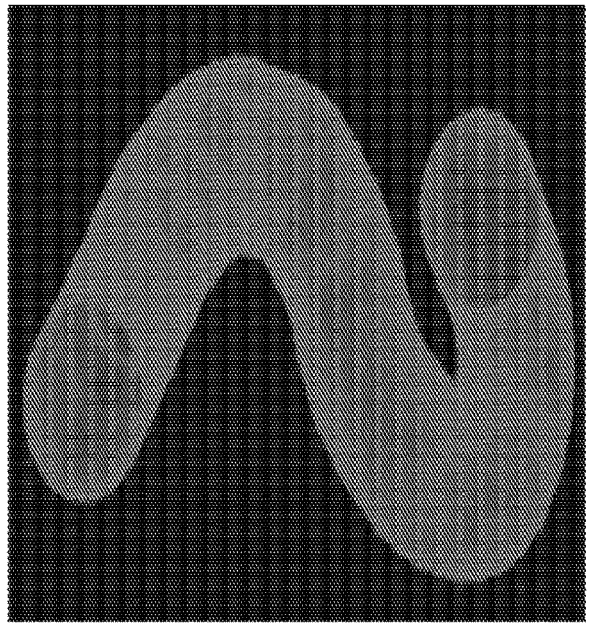
2170  2175
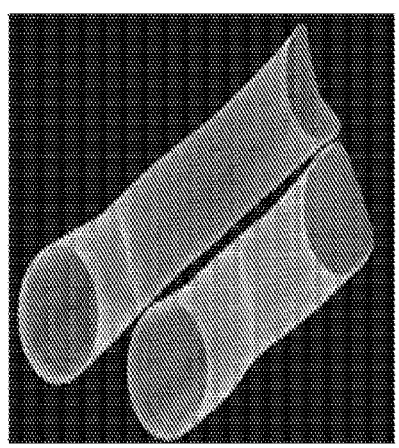 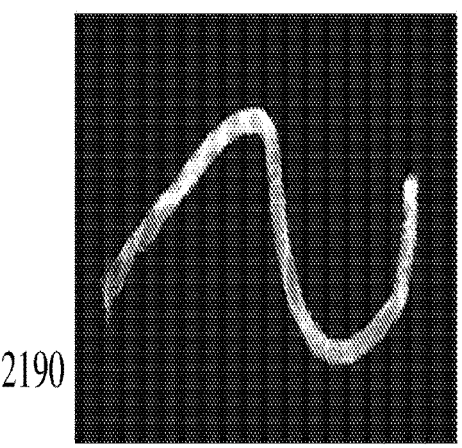
2180  2190
Figure 21B
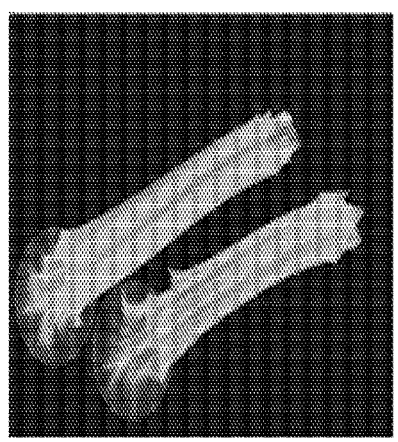 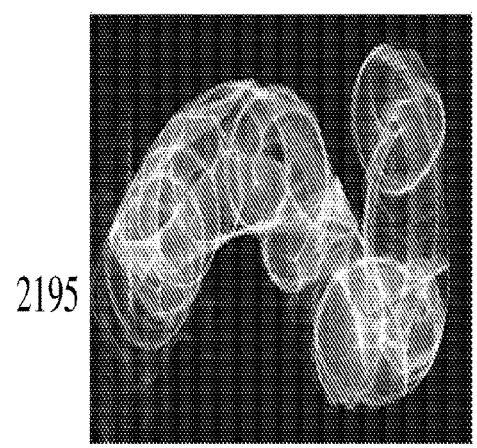
2185  2195

METHODS AND SYSTEMS FOR GENERATING GRAPHICAL CONTENT THROUGH PHYSICAL SYSTEM MODELLING

REFERENCE TO RELATED APPLICATIONS

This application is a continuation of U.S. patent application Ser. No. 16/050,215 filed on Jul. 31, 2018, which is a continuation of U.S. patent Ser. No. 15/664,007 filed Jul. 31, 2017, issued on Sep. 4, 2018 as U.S. Pat. No. 10,068,355, which is a continuation of U.S. patent application Ser. No. 14/822,966 filed Aug. 11, 2015, issued on Nov. 21, 2017 as U.S. Pat. No. 9,824,464, which itself claims the benefit of priority of U.S. Provisional Patent Application 62/035,538 filed Aug. 11, 2014. The above referenced applications are incorporated by reference herein in their respective entireties.

FIELD OF THE INVENTION

The invention relates to digital imagery and more particularly to reducing visual perceptions of digital generation and providing mark making tools simulating physical systems.

BACKGROUND OF THE INVENTION

Digital graphics and digital image editing are the processes of creating and/or modifying digitally generated or digitally acquired and stored image data. Using specialized software programs, users may create, generate, manipulate, edit and transform images in a variety of ways. These digital image editors may include programs of differing complexity, such as limited-purpose programs associated with acquisition devices (e.g., digital cameras and scanners with bundled or built-in programs for managing brightness and contrast); limited editors suitable for relatively simple operations such as rotating and cropping images; and professional-grade programs with large and complex feature sets. Similarly, digital graphics editors may include programs of differing complexity, such as limited-purpose programs associated with acquisition devices (e.g., digital cameras and scanners with bundled or built-in programs for managing colour balance or applying specific graphics effects); limited editors suitable for relatively simple graphics generation (e.g., for example as part of general suites of software for business and/or residential users); and professional-grade programs with large and complex feature sets (e.g., simulating different artistic formats such as watercolour, calligraphy, pastels, oils, etc. with various applicators including various brushes, pens, air brushes, markers, sponges and knives).

Digital graphics and digital images may include, for example, "formatted" graphics and/or graphics data for use in generating an image with a digital graphics editor suite prior to "printing" the final or interim image. Accordingly, such graphics and images may include raster graphics, vector graphics, or a combination thereof. Raster graphics data (also referred to herein as bitmaps) may be stored and manipulated as a grid of individual picture elements called pixels. A bitmap may be characterized by its width and height in pixels and also by the number of bits per pixel. Commonly, a colour bitmap defined in the RGB (red, green blue) colour space may comprise between one and eight bits per pixel for each of the red, green, and blue channels. Another commonly used representation is a CMYK colour space. In these and other colour space representations, an alpha channel may be used to store additional data such as per-pixel transparency values (or the inverse-opacity values). For example, per-pixel data representing paint on a brush tool or on a canvas may include a set of colour values (e.g., one per channel) and an opacity value for the paint. In contrast vectors graphics are generally characterized by the use of geometrical primitives such as points, lines, curves, and shapes or polygons, all of which are based on mathematical expressions, to represent images along with boundary information (e.g. stroke line style and colour) and fill information (e.g. fill style and colour).

An operation often provided by digital graphics and digital image editors is the use of a virtual "paintbrush" (also referred to herein as a "brush", "brush tool", or mark making tool) to modify a digital image by depositing virtual paint or virtual ink. Various prior approaches have attempted to model a real-world brush and its behavior in the context of such an operation. For example, a two-dimensional (2D) raster image may be created to represent the shape of the brush as it contacts the canvas, and the 2D image may be stamped repeatedly along the input path. In another approach, a vector representation of the brush tip has been used instead of a 2D raster image.

Some existing digital painting applications create strokes by repeatedly applying a stamp at incremental positions along a path. The stamp consists of a 2D array of pixels that represent what the "brush" looks like at an instant in time. By repeatedly applying the stamp at close spacing, the effect of the brush being dragged continuously across the canvas is created, in the form of an elongated stroke. Some existing applications provide multiple settings for users to control the appearance of the stroke, e.g. size, opacity, mark making tool, and brush style. However, such applications led to uniform marks being made by the mark making tool along the stroke as the same process as applied by the software application at each point along the stroke. Accordingly, most existing applications in order to increase the realism of strokes by simulating varying user tool handling, pressure, angle of tool, etc. provide for the application of predefined functions and/or jitter to the values of the mark making tool within the stroke. Predefined functions address, for example, the initial or final stages of a stroke for the application of a brush to canvas whilst jitter addresses the intervening section of the stroke. In this manner, a brush stroke may be simulated as having increasing pressure at the beginning of stroke, some variability in pressure during the stroke, and decreasing pressure at the end of the stroke.

However, a problem with this approach is that the results can often yield, either through combining it with variations in other aspects of the stroke or solely, to strokes with mark making tools that are rendered by the software application being unnatural and appearing artificial despite the goal of the software application being to simulate as realistically as possible physical graphics image generating techniques such as painting with watercolours. Accordingly, it would be beneficial to provide either users or the software application with a mechanism to remove or reduce artifacts indicative of artificial generation, e.g. rapid transitions.

In a wide variety of applications the graphic images being generated and/or manipulated refer to imagined environments or have elements that are physical in nature. For example, science fiction art can represent anything from an alien character through to an imagined view of a galaxy, solar system etc. Accordingly, it would be beneficial to provide users with a range of mark making tools that do not mimic a mark making tool such as a brush, air brush, pen, etc. but rather represent marks made by mark making tools comprising multiple elements following physical laws.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to address limitations within the prior art relating to digital imagery and more particularly to reducing visual perceptions of digital generation and providing mark making tools simulating physical systems.

In accordance with an embodiment of the invention there is provided a method of generating a mark making tool impression having a characteristic determined by a pseudo-random variable during its generation comprising adding a predetermined noise function to an original mark making tool impression generated in dependence upon at least the pseudo-random variable.

In accordance with an embodiment of the invention there is provided a method of generating a mark making tool impression comprising: establishing a mark making tool comprising at least one particle of a plurality of particles; associating a property to each particle of the plurality of particles; applying at least one physical effect to the plurality of particles during the generation of an impression using the mark making tool.

In accordance with an embodiment of the invention there is provided a method of generating a mark making tool impression comprising: establishing a mark making tool comprising at least one particle of a plurality of particles; associating a property to each particle of the plurality of particles; applying at least one physical effect to the plurality of particles during the generation of an impression using the mark making tool; and varying an aspect of the at least one physical effect in dependence upon a characteristic of a controller being used by a user to generate the mark making tool impression.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIGS. 17 and 18 depict the effects of spin and velocity expression of spin respectively for gravity particles within a gravity particle mark making tool according to an embodiment of the invention within a digital graphics editor, digital painting, application;

FIG. 21B depicts the effects of opacity and spring length upon a spring particle mark making tools according to embodiments of the invention within a digital graphics editor, digital painting, application;

DETAILED DESCRIPTION

Figure 1A:
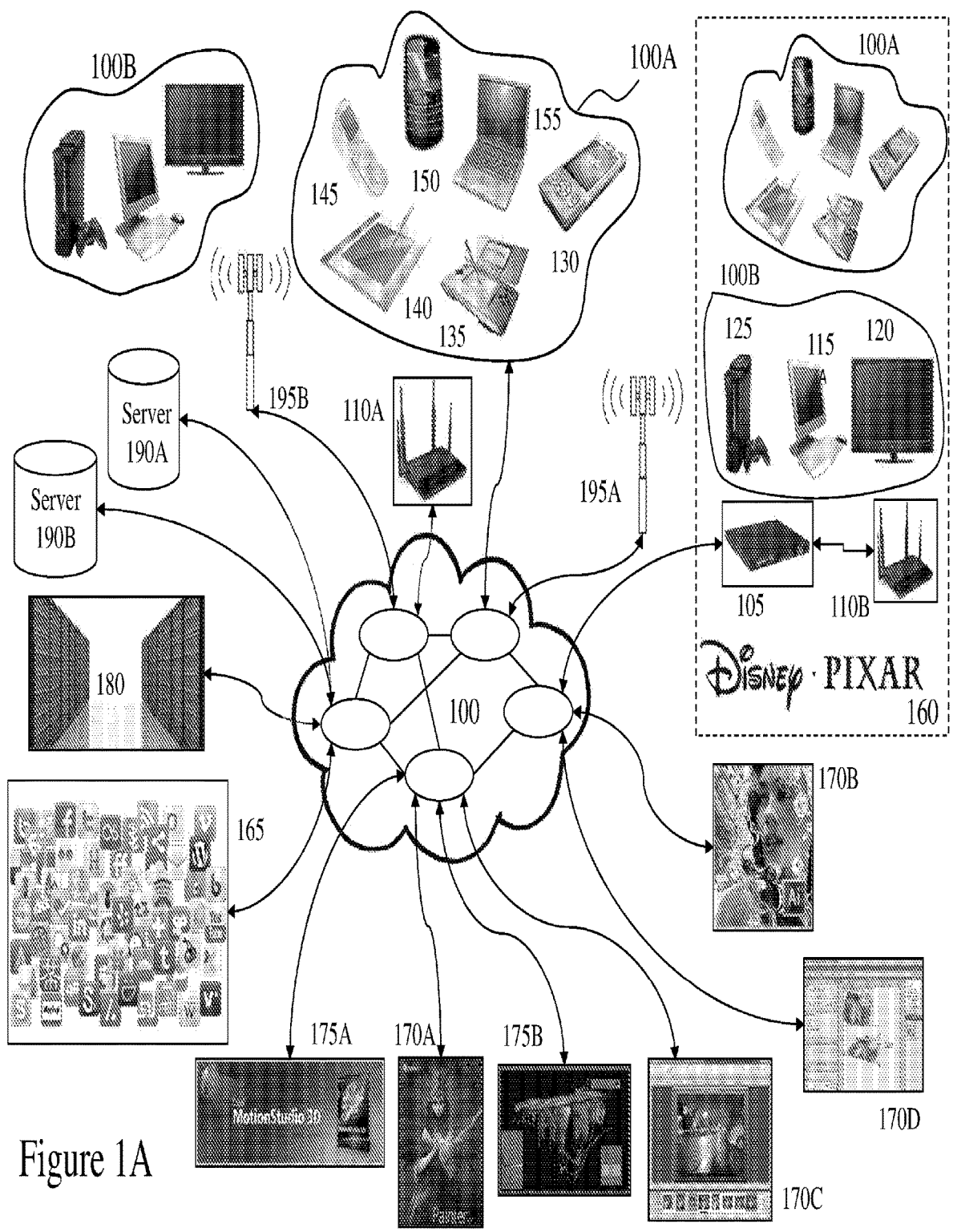
FIG. 1A depicts a network environment within which embodiments of the invention may be employed.

The present invention is directed to digital imagery and more particularly to reducing visual perceptions of digital generation and providing mark making tools simulating physical systems.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "software application", also referred to as an "application" or "app", as used herein may refer to, but is not limited to, a "standalone software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

An "enterprise" as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider" as used herein may refer to, but is not limited to, a third party provider of a service and/or a product to an enterprise and/or individual and/or group of individuals and/or a device comprising a microprocessor. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A 'third party' or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" as used herein may refer to, but is not limited to, an individual or group of individuals whose biometric data may be, but not limited to, monitored, acquired, stored, transmitted, processed and analysed either locally or remotely to the user wherein by their engagement with a service provider, third party provider, enterprise, social network, social media etc. via a dashboard, web service, website, software plug-in, software application, graphical user interface acquires, for example, electronic content. This includes, but is not limited to, private individuals, employees of organizations and/or enterprises, members of community organizations, members of charity organizations, men, women, children, teenagers, and animals. In its broadest sense the user may further include, but not be limited to, software systems, mechanical systems, robotic systems, android systems, etc. that may be characterised by providing a gesture or data relating to a gesture to a software application.

A "wearable device" or "wearable sensor" relates to miniature electronic devices that are worn by the user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, and motion sensors.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is capable of being at least one of generated, selected, created, modified, and transmitted with a software application allowing a user of the software application to generate, select, create, modify, and edit visual and/or audiovisual content within the digital content.

Reference to a "document" as used herein may refer to, but is not limited to, any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.). In the context of the Internet, a common document is a Web page. Web pages often include content and may include embedded information (such as meta-information, hyperlinks, etc.) and/or embedded instructions (such as Javascript, etc.). In many cases, a document has a unique, addressable, storage location and can therefore be uniquely identified by this addressable location such as a universal resource locator (URL) for example used as a unique address used to access information on the Internet. "Document information" as used herein may refer to, but is not limited to, may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

A "mark making tool", also referred to as a "mark tool" or "marking tool", as used herein may refer to, a tool for applying a visual effect to a graphics image within a software application including, for example, a graphics generating tool, a graphics editing tool, and an image processing tool. Accordingly, a mark making tool may simulate real and unreal systems for the application, removal, or modification of information including, but not limited to, colour, texture, and content to a graphics image. As such a mark making tool may include, but is not limited to, a brush, an air brush, a pen, a pencil, a nib, a spray can, a sprayer, a sponge, a knife, a mathematical algorithm, a physical system of elements obeying physical laws, and a physical system obeying non-physical laws.

A "gesture", also referred to as a "motion" or "input", as used herein may refer to, an action resulting in the movement and/or action of a mark making tool relative to a graphics image within a software application including, for example, a graphics generating tool, a graphics editing tool, and an image processing tool. As such a gesture may include, but not be limited to, a swipe, a tap, a motion, a press, and a click captured by the software application through an interface including, but not limited to, image processing, image capture, audio command, a user interface and a haptic interface.

A "gesture characteristic", also referred to as a "gesture expression" or an "expression", as used herein may refer to an aspect of a gesture exploited within a software application to modify a value relating to a mark making tool within the software application. As such a gesture characteristic or expression may include, but not be limited to, velocity, direction, pressure, wheel, tilt, bearing, rotation, source of the gesture, and random. A source of the gesture may include, but not be limited to, a touchpad, a stylus, a mouse, keypad, keyboard, accelerometer or accelerometer derived data, tracked motion of a user or a predetermined portion of a user, an external image source, an external audiovisual source, an external multimedia source, biometric data of a user, and an item of environmental data. An expression or gesture characteristic may be applied to one or more behaviours/aspects of a mark making tool including, but not limited to, global chaos, local chaos, smoothness, damping, jitter, number, count, weighting, force, direction, mapping, colour, colour variability, resaturation, bleed, feature, grain, concentration, setting rate, viscosity, wetness, opacity and hardness.

A "user interface", also referred to as a "controller" or "haptic interface", as used herein may refer to a device and/or system capturing one or more actions of a user and providing these to a software application. Accordingly, a user interface may include an image capture/processing system, a gesture recognition system, a stylus, a wearable device, a touchscreen, a keypad, a mouse, a touchpad, a tablet, an accelerometer, and a motion recognition system.

Referring to FIG. 1A there is depicted a network environment 100 within which embodiments of the invention may be employed supporting graphics editing systems and graphics editing applications/platforms (GESGEAPs) according to embodiments of the invention. Such GESGEAPs, for example including digital graphics editor and digital painting applications. As shown first and second user groups 100A and 100B respectively interface to a telecommunications network 100. Within the representative telecommunication architecture a remote central exchange 180 communicates with the remainder of a telecommunication service providers network via the network 100 which may include for example long-haul OC-48/OC-192 backbone elements, an OC-48 wide area network (WAN), a Passive Optical Network, and a Wireless Link. The central exchange 180 is connected via the network 100 to local, regional, and international exchanges (not shown for clarity) and therein through network 100 to first and second cellular APs 195A and 195B respectively which provide Wi-Fi cells for first and second user groups 100A and 100B respectively. Also connected to the network 100 are first and second Wi-Fi nodes 110A and 110B, the latter of which being coupled to network 100 via router 105. Second Wi-Fi node 110B is associated with Enterprise 160, e.g. Disney Pixar™, within which are other first and second user groups 100A and 100B. Second user group 100B may also be connected to the network 100 via wired interfaces including, but not limited to, DSL, Dial-Up, DOCSIS, Ethernet, G.hn, ISDN, MoCA, PON, and Power line communication (PLC) which may or may not be routed through a router such as router 105.

Within the cell associated with first AP 110A the first group of users 100A may employ a variety of PEDs including for example, laptop computer 155, portable gaming console 135, tablet computer 140, smartphone 150, cellular telephone 145 as well as portable multimedia player 130. Within the cell associated with second AP 110B are the second group of users 100B which may employ a variety of FEDs including for example gaming console 125, personal computer 115 and wireless/Internet enabled television 120 as well as cable modem 105. First and second cellular APs 195A and 195B respectively provide, for example, cellular GSM (Global System for Mobile Communications) telephony services as well as 3G and 4G evolved services with enhanced data transport support. Second cellular AP 195B provides coverage in the exemplary embodiment to first and second user groups 100A and 100B. Alternatively the first and second user groups 100A and 100B may be geographically disparate and access the network 100 through multiple APs, not shown for clarity, distributed geographically by the network operator or operators. First cellular AP 195A as show provides coverage to first user group 100A and environment 170, which comprises second user group 100B as well as first user group 100A. Accordingly, the first and second user groups 100A and 100B may according to their particular communications interfaces communicate to the network 100 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-1000. It would be evident to one skilled in the art that many portable and fixed electronic devices may support multiple wireless protocols simultaneously, such that for example a user may employ GSM services such as telephony and SMS and Wi-Fi/WiMAX data transmission, VOW and Internet access. Accordingly portable electronic devices within first user group 100A may form associations either through standards such as IEEE 802.15 and Bluetooth as well in an ad-hoc manner.

Also connected to the network 100 are Social Networks (SOCNETS) 165, first and second graphics editors 170A and 170B respectively, e.g. Corel™ Painter™ and Adobe™ Illustrator, first and second web based graphic editors 170C and 170D respectively, e.g. PhotoCommander™ and FatPaint™, and first and second video editing tools 175A and 175B respectively, e.g. Corel™ MobileStudio™ and Cinnerla™, as well as first and second servers 190A and 190B which together with others, not shown for clarity. First and second servers 190A and 190B may host according to embodiments of the inventions multiple services associated with a provider of graphics editing systems and graphics editing applications/platforms (GESGEAPs); a provider of a SOCNET or Social Media (SOME) exploiting GESGEAP features; a provider of a SOCNET and/or SOME not exploiting GESGEAP features; a provider of services to PEDS and/or FEDS; a provider of one or more aspects of wired and/or wireless communications; an Enterprise 160 exploiting GESGEAP features; license databases; content databases; image databases; content libraries; customer databases; websites; and software applications for download to or access by FEDs and/or PEDs exploiting and/or hosting GESGEAP features. First and second primary content servers 190A and 190B may also host for example other Internet services such as a search engine, financial services, third party applications and other Internet based services.

Accordingly, a graphics designer and/or user (GRADUS or user) may exploit a PED and/or FED within an Enterprise 160, for example, and access one of the first or second primary content servers 190A and 190B respectively to perform an operation such as accessing/downloading an application which provides GESGEAP features according to embodiments of the invention; execute an application already installed providing GESGEAP features; execute a web based application providing GESGEAP features; or access content. Similarly, a GRADUS may undertake such actions or others exploiting embodiments of the invention exploiting a PED or FED within first and second user groups 100A and 100B respectively via one of first and second cellular APs 195A and 195B respectively and first Wi-Fi nodes 110A.

Figure 1B:
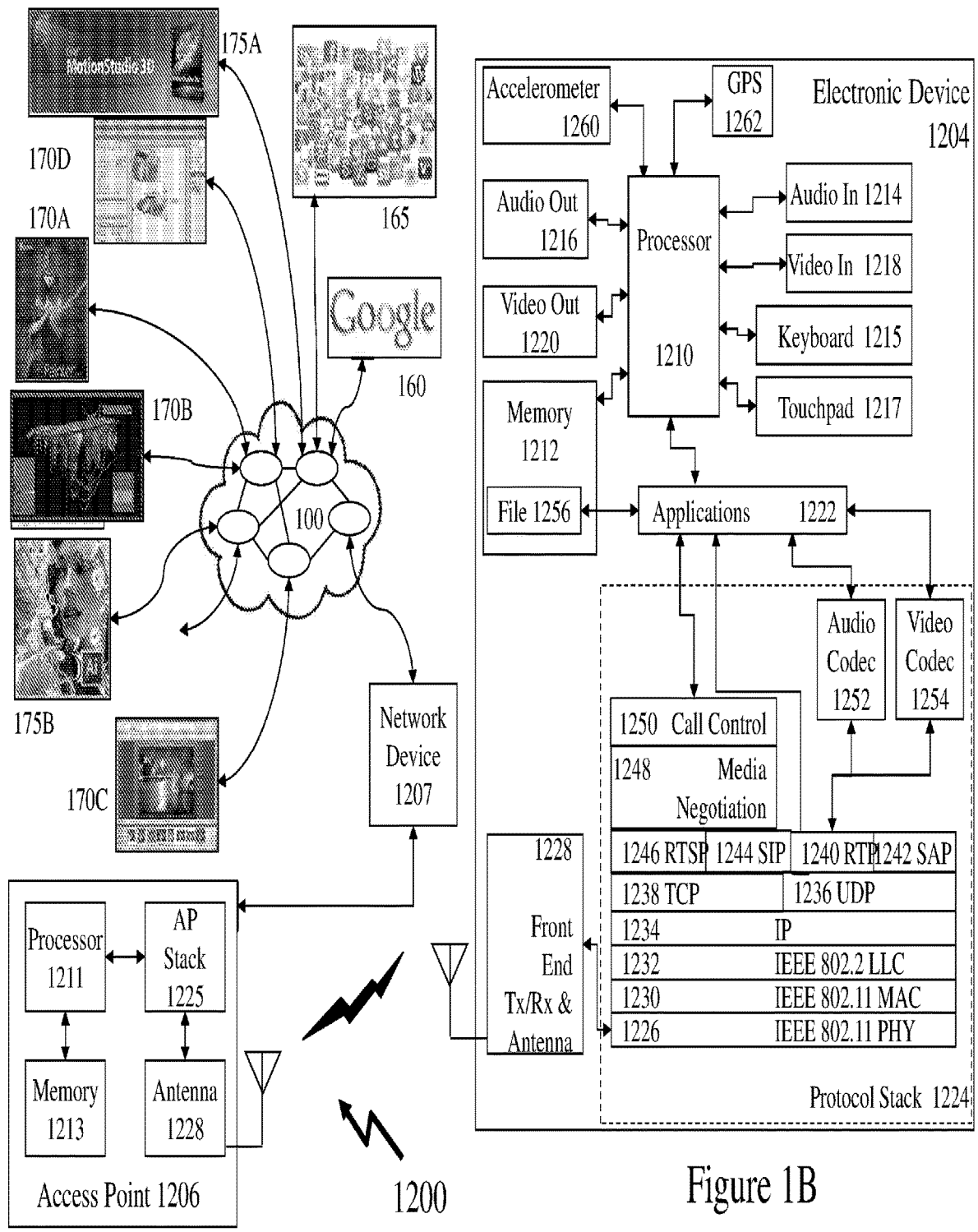
FIG. 1B depicts a wireless portable electronic device supporting communications to a network such as depicted in FIG. 1A and as supporting embodiments of the invention.

Now referring to FIG. 1B there is depicted an electronic device 1204 and network access point 1207 supporting GESGEAP features according to embodiments of the invention. Electronic device 1204 may, for example, be a PED and/or FED and may include additional elements above and beyond those described and depicted. Also depicted within the electronic device 1204 is the protocol architecture as part of a simplified functional diagram of a system 1200 that includes an electronic device 1204, such as a smartphone 155, an access point (AP) 1206, such as first AP 110, and one or more network devices 1207, such as communication servers, streaming media servers, and routers for example such as first and second servers 190A and 190B respectively. Network devices 1207 may be coupled to AP 1206 via any combination of networks, wired, wireless and/or optical communication links such as discussed above in respect of FIG. 1 as well as directly as indicated. Network devices 1207 are coupled to network 100 and therein Social Networks (SOCNETS) 165, first and second graphics editors 170A and 170B respectively, e.g. Corel™ Painter™ and Adobe™ Illustrator, first and second web based graphic editors 170C and 170D respectively, e.g. PhotoCommander™ and FatPaint™, and first and second video editing tools 175A and 175B respectively, e.g. Corel™ MobileStudio™ and Cinnerla™. The electronic device 1204 includes one or more processors 1210 and a memory 1212 coupled to processor(s) 1210. AP 1206 also includes one or more processors 1211 and a memory 1213 coupled to processor(s) 1210. A non-exhaustive list of examples for any of processors 1210 and 1211 includes a central processing unit (CPU), a digital signal processor (DSP), a reduced instruction set computer (RISC), a complex instruction set computer (CISC) and the like. Furthermore, any of processors 1210 and 1211 may be part of application specific integrated circuits (ASICs) or may be a part of application specific standard products (ASSPs). A non-exhaustive list of examples for memories 1212 and 1213 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

Electronic device 1204 may include an audio input element 1214, for example a microphone, and an audio output element 1216, for example, a speaker, coupled to any of processors 1210. Electronic device 1204 may include a video input element 1218, for example, a video camera or camera, and a video output element 1220, for example an LCD display, coupled to any of processors 1210. Electronic device 1204 also includes a keyboard 1215 and touchpad 1217 which may for example be a physical keyboard and touchpad allowing the user to enter content or select functions within one of more applications 1222. Alternatively the keyboard 1215 and touchpad 1217 may be predetermined regions of a touch sensitive element forming part of the display within the electronic device 1204. The one or more applications 1222 that are typically stored in memory 1212 and are executable by any combination of processors 1210. Electronic device 1204 also includes accelerometer 1260 providing three-dimensional motion input to the process 1210 and GPS 1262 which provides geographical location information to processor 1210.

Electronic device 1204 includes a protocol stack 1224 and AP 1206 includes a communication stack 1225. Within system 1200 protocol stack 1224 is shown as IEEE 802.11 protocol stack but alternatively may exploit other protocol stacks such as an Internet Engineering Task Force (IETF) multimedia protocol stack for example. Likewise AP stack 1225 exploits a protocol stack but is not expanded for clarity.

Elements of protocol stack 1224 and AP stack 1225 may be implemented in any combination of software, firmware and/or hardware. Protocol stack 1224 includes an IEEE 802.11-compatible PHY module 1226 that is coupled to one or more Front-End Tx/Rx & Antenna 1228, an IEEE 802.11-compatible MAC module 1230 coupled to an IEEE 802.2-compatible LLC module 1232. Protocol stack 1224 includes a network layer IP module 1234, a transport layer User Datagram Protocol (UDP) module 1236 and a transport layer Transmission Control Protocol (TCP) module 1238.

Protocol stack 1224 also includes a session layer Real Time Transport Protocol (RTP) module 1240, a Session Announcement Protocol (SAP) module 1242, a Session Initiation Protocol (SIP) module 1244 and a Real Time Streaming Protocol (RTSP) module 1246. Protocol stack 1224 includes a presentation layer media negotiation module 1248, a call control module 1250, one or more audio codecs 1252 and one or more video codecs 1254. Applications 1222 may be able to create maintain and/or terminate communication sessions with any of devices 1207 by way of AP 1206. Typically, applications 1222 may activate any of the SAP, SIP, RTSP, media negotiation and call control modules for that purpose. Typically, information may propagate from the SAP, SIP, RTSP, media negotiation and call control modules to PHY module 1226 through TCP module 1238, IP module 1234, LLC module 1232 and MAC module 1230.

It would be apparent to one skilled in the art that elements of the electronic device 1204 may also be implemented within the AP 1206 including but not limited to one or more elements of the protocol stack 1224, including for example an IEEE 802.11-compatible PHY module, an IEEE 802.11-compatible MAC module, and an IEEE 802.2-compatible LLC module 1232. The AP 1206 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module. Portable and fixed electronic devices represented by electronic device 1204 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, DSL, Dial-Up, DOCSIS, Ethernet, G.hn, ISDN, MoCA, PON, and Power line communication (PLC).

Figure 1C:
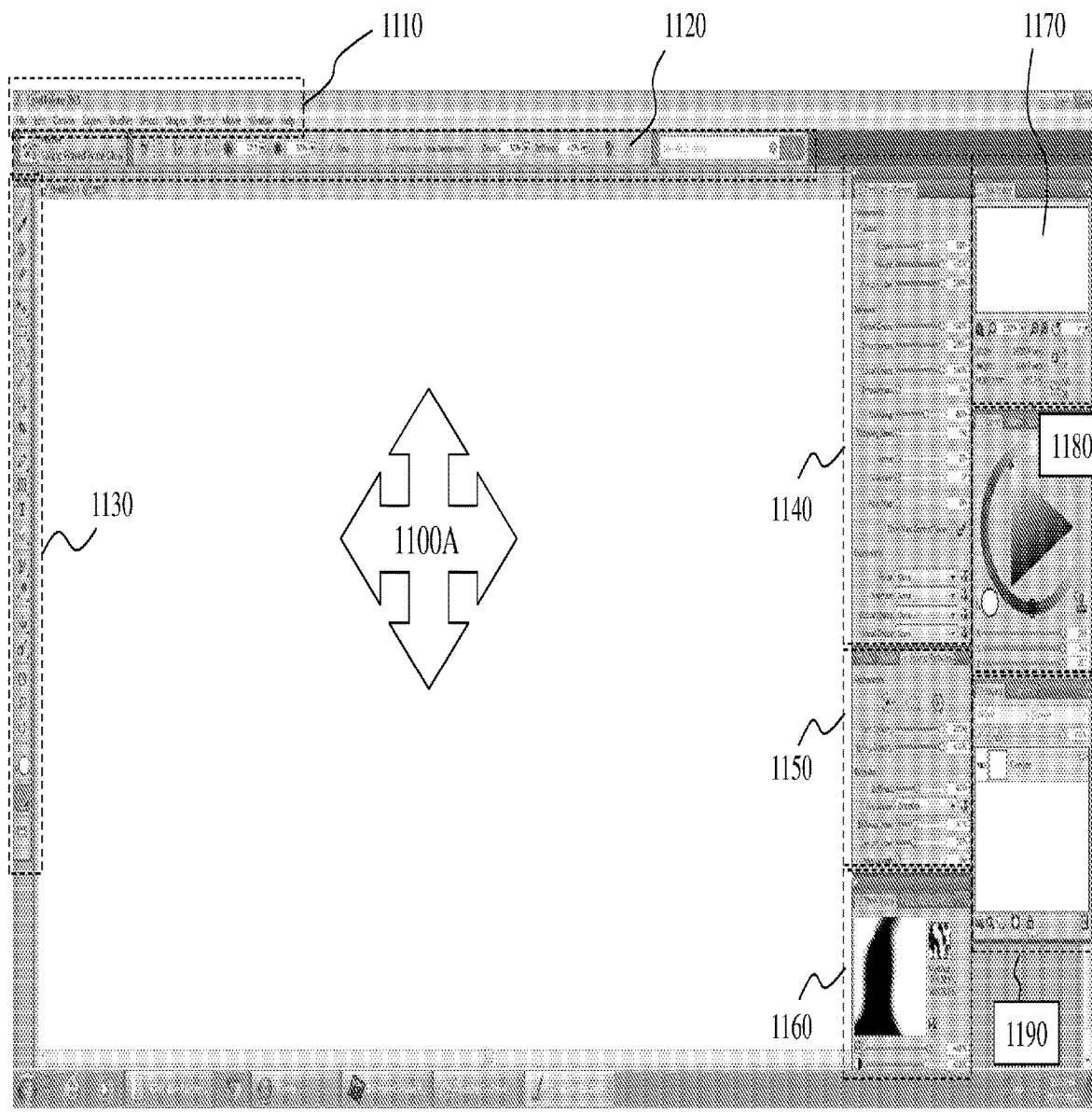
FIG. 1C depicts home screen of a digital graphics editor, digital painting, application according to an embodiment of the invention.

Now referring to FIG. 1C there is depicted a home screen 1100 of a digital graphics editor, digital painting, application, the GESGEAP, according to an embodiment of the invention, e.g. Corel™ Painter 2015. Accordingly, within the home screen 1100 a user has opened a window 1100A, which may for example be untextured, textured to mimic a paper, canvas, or other surface for "painting." Optionally, a texture may be applied prior to the user beginning work, during their work, or upon its completion. Similarly, other effects may be added by the user through the menu bar 1110 including employing multiple layers with different effects and/or properties, different illuminations, etc. as known within the art. The user is also presented with a series of menus that can be manipulated, docked, undocked and moved with respect to the home screen 1100 and allowing the user to select, adjust, modify, add, delete, and control various aspects of their interaction with the GESGEAP. These include, but are not limited to:

Mark making tool selector and summary settings 1120;
Main feature menu 1130;
General particle mark making tool menu 1140;
Particle mark making tool menu 1150;
Flow mapping menu 1160;
Canvas navigator menu 1170;
Colour menu 1180; and
Layer/channel management menu 1190.

Accordingly, within the embodiments of the invention described below and in respect of FIGS. 2 to 22 a user may select features and functionalities according to embodiments of the invention and establish aspects of these at different settings through such menus and others as would be evident to one of skill in the art.

As noted supra prior art GESGEAPs in order to improve realism within graphical images generated and/or modified by users with the GESGEAPs mark making tools provide automatic generation options in response to the user's stroke with the mark making tool. Whilst many, of these automatically generated aspects of the user's stroke do indeed add perceived realisms such as varying brush pressure on application/removal from a canvas and/or paper or the abrupt application from activation of a spray can nozzle for example. However, in many instances these automatically generated effects within the stroke are implemented through the application of random behaviours to the strokes which actually appear less realistic as they reflect instances that a user, for example, painting with watercolours or oils, could not achieve. Accordingly, the inventors have established a methodology of automatically adding noise to the computer generated mark making tool stroke allowing aspects of the mark making tool generated to be varied. The inventors have associated the terms "feature jitter" and "jitter smoothing" to the concept and refer to mark making tools with such jitter smoothing as jitter mark making tools and may be denoted within a GESGEAP by the addition of "jitter" within the mark making tool nomenclature to denote mark making tools with this feature according to embodiments of the invention.

For example, within Corel™ Painter 2015, such a series of mark making tools according to embodiments of the invention are provided within different categories of mark making tools including:

Airbrushes—Coarse Spray Jitter;
Artists—Coarse Sargent Brush Jitter, Impressionist Brush Jitter, and Sargent Super Jitter;
Chalks—Real Chalk Jitter;
Gel—Gel Fractal Jitter;
Gouache—Gouache Rake Jitter;
Impasto—Captured Impasto Blender Jitter, Coarse Impasto Jitter, and Heavy Impasto Stamp Jitter;
Markers—Worn Marker Jitter;
Palette Knives—Pointed Palette Knife Brush Jitter, Pointed Palette Knife Plow Jitter;
Real Watercolour—Light Fringe Jitter, and Real Wet Jitter Sponge; and
Sponges—Grainy Jitter Sponge.

The user may through a user interface, i.e. pop-up menu, associated with their selected mark making tool adjust the jitter smoothing applied to the randomness of their mark making tool impressions given them a more natural, organic look. Accordingly, the user may control the amount of jitter that their brush produces and, in general, the jitter control the user can modify are determined by the jitter brush variant the user selects. For example, if the user selects "Coarse Spray Jitter" variant from the Airbrushes category then the user can adjust the following characteristics:

Size Jitter via Size brush control panel;
    Feature Jitter and Flow Jitter via Airbrush brush control panel;
    Opacity Jitter via Opacity brush control panel; and
    Stroke Jitter via Stroke brush control panel.

Figure 2:
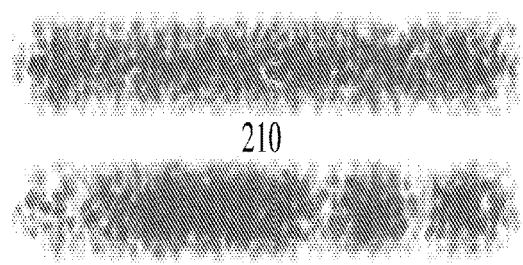
FIGS. 2, 3A and 3B depict examples of effect naturalization applied to different marks generated with a mark making tool according to embodiments of the invention.
Figure 2:
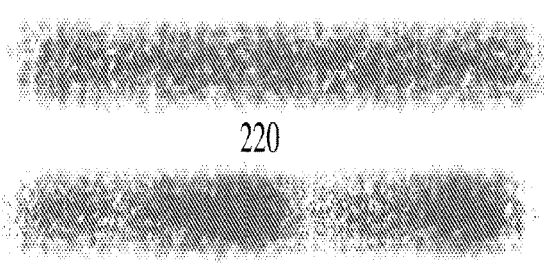
Figure 2:
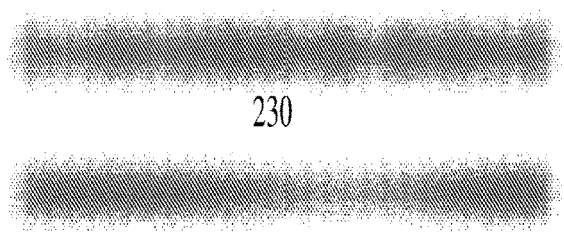
Figure 2:
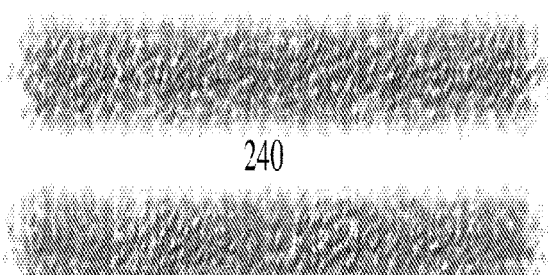
Figure 2:
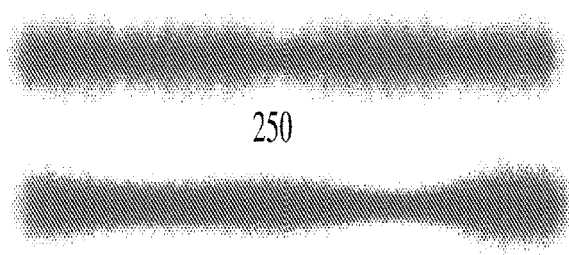
Figure 2:
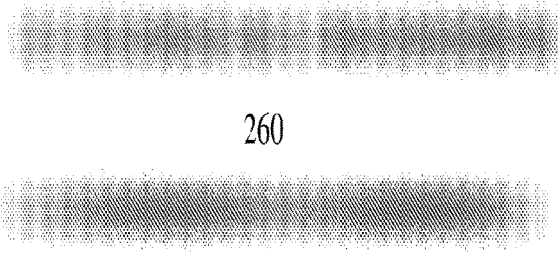

Other mark making tool controls with jitter control may include, but are not limited, to Grain. Size, Angle, Color Expression, and Impasto. Referring to FIG. 2 there are depicted first to sixth GESGEAP effects 210 to 260 respectively wherein the upper image represents the graphical image generated without jitter smoothing and the lower image represents the graphical image resulting from application of the jitter smoothing according to embodiments of the invention. These being:

First effect 210 Airbrush Feature;
    Second effect 220 Airbrush Flow;
    Third effect 230 Grain;
    Fourth effect 240 Impasto;
    Fifth effect 250 Opacity; and
    Sixth effect 260 Size.

Figure 3A:
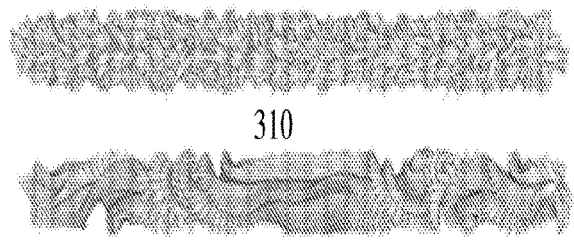
Figure 3A:
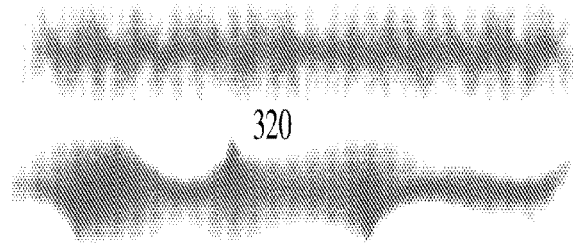
Figure 3A:
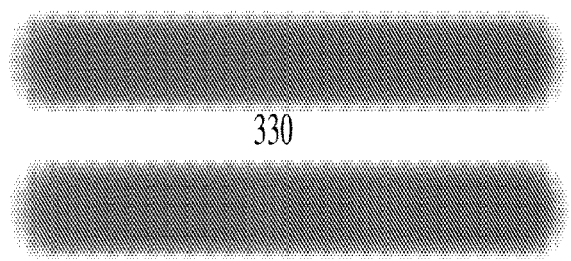
Figure 3A:
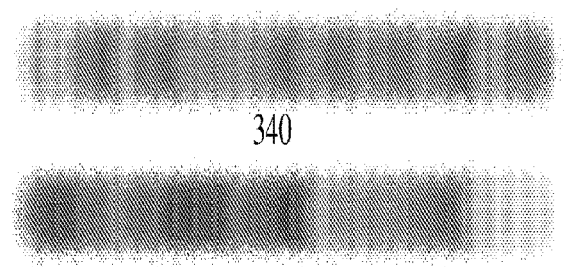
Figure 3A:
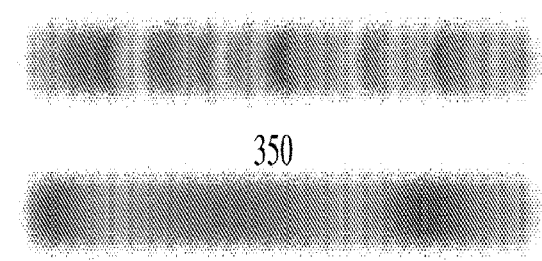
Figure 3A:
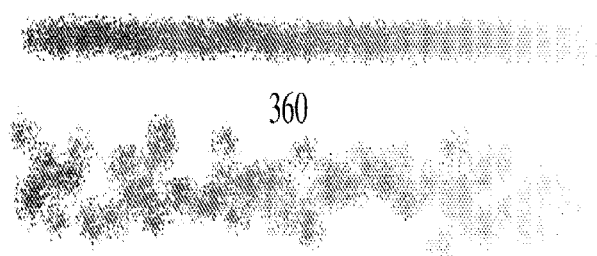

Referring to FIG. 3A there are depicted first to sixth GESGEAP effects 310 to 360 respectively wherein the upper image represents the graphical image generated without jitter smoothing and the lower image represents the graphical image resulting from application of the jitter smoothing according to embodiments of the invention. These being:

First effect 310 Angle Hose;
    Second effect 320 Angle;
    Third effect 330 Colour Expression;
    Fourth effect 340 Colour Variability from Set;
    Fifth effect 350 Colour Variability; and
    Sixth effect 360 Stroke Jitter.

Figure 3B:
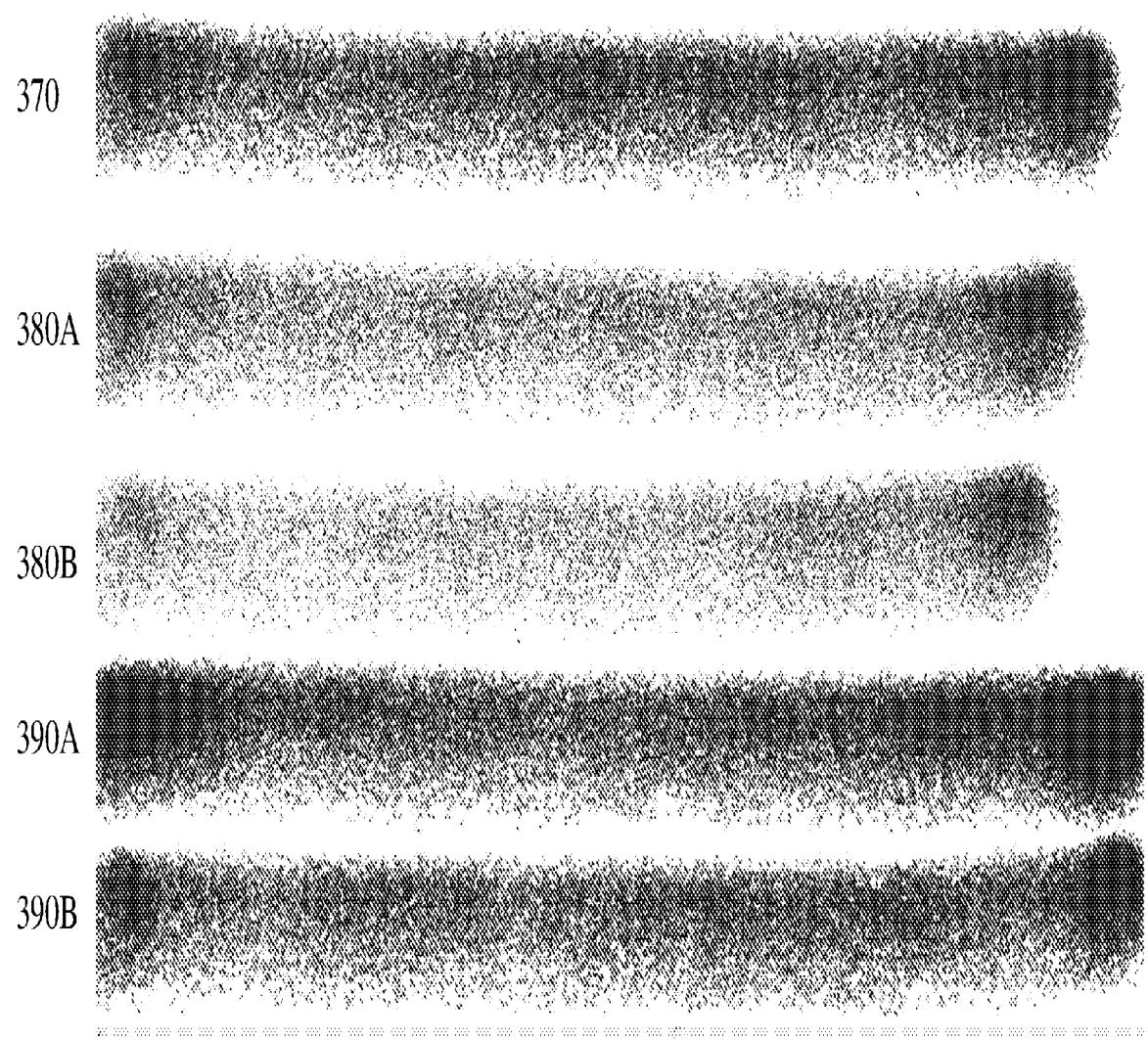

Now referring to FIG. 3B there are depicted baseline airbrush effect 370 together with first and second feature jitter images 380A and 380B respectively and first and second jitter smoothing images 390A and 390B. Accordingly, first and second smoothing images 390A and 390B represent 50% and 100% smoothing settings within Corel™ Painter 2015 for the airbrush feature wherein the smoothing function would represent a feature known to one of skill in the art. In contrast, first and second feature jitter images 380A and 380B depict the 50% and 100% feature jitter settings within Corel™ Painter 2015 for the airbrush feature. Accordingly, it is evident that the impact of feature jitter is different to that of smoothing.

The jitter feature/jitter smoothing acts differently to smoothing as evident from Equations (1) to (3) below. Referring to Equation (1) the value of a feature characteristic of a mark making tool, $\Im$, is the sum of an initial value, $\Im_0$, and a randomly generated value having upper and lower limits wherein the randomly generated value is determined in dependence upon an expression, e.g. sequentially generated for each impression of the mark making tool or element of the mark making tool. In contrast, smoothing as defined in Equation (2) takes the current generated value and then applies an average value over a number of applications of the mark making tool or element of the mark making tool. Accordingly, the randomness is smoothed out. In contrast, the feature jitter function as defined, for example, by Equation (3) adds a noise value to the sum of an initial value, $\Im_0$, and a randomly generated value having upper and lower limits wherein the noise value added is dependent upon the feature jitter setting established within the GESGEAP automatically by the GESGEAP or manually by the user. Equations (1) to (3) are exemplary equations only to demonstrate the prior art in Equations (1) and (2) and the invention, Equation (3). It would be evident that a variety of mathematical processes for the addition of a noise function to a randomly generated characteristic of a mark marking tool or effect generated by a mark making tool may be employed without departing from the scope of the invention.

$$\Im = \Im_0 + RND_{LOWER}^{UPPER}(\text{Expression}) \tag{1}$$

$$\Im = \Im_0 + RND_{LOWER}^{UPPER}(\text{Expression}) + AVG_{-N}^{+N}(RND_{LOWER}^{UPPER}(\text{Expression})) \tag{2}$$

$$\Im = \Im_0 + RND_{LOWER}^{UPPER}(\text{Expression}) + \aleph_{NOISE\_LOWER}^{NOISE\_UPPER}(\text{Expression, Jitter\_Setting})) \tag{3}$$

The noise function employed, $\aleph_{NOISE\_LOWER}^{NOISE\_UPPER}(\text{Expression, Jitter\_Setting})$, may for example be gradient noise (such as Perlin noise and Simplex noise for example), value noise, Wavelet noise, power-law noise, white noise, pink noise, brown noise, blue noise, violet noise, grey noise, red noise, green noise, black noise, noisy white noise, noisy black noise and additive white Gaussian noise (AWGN).

Figure 4A:
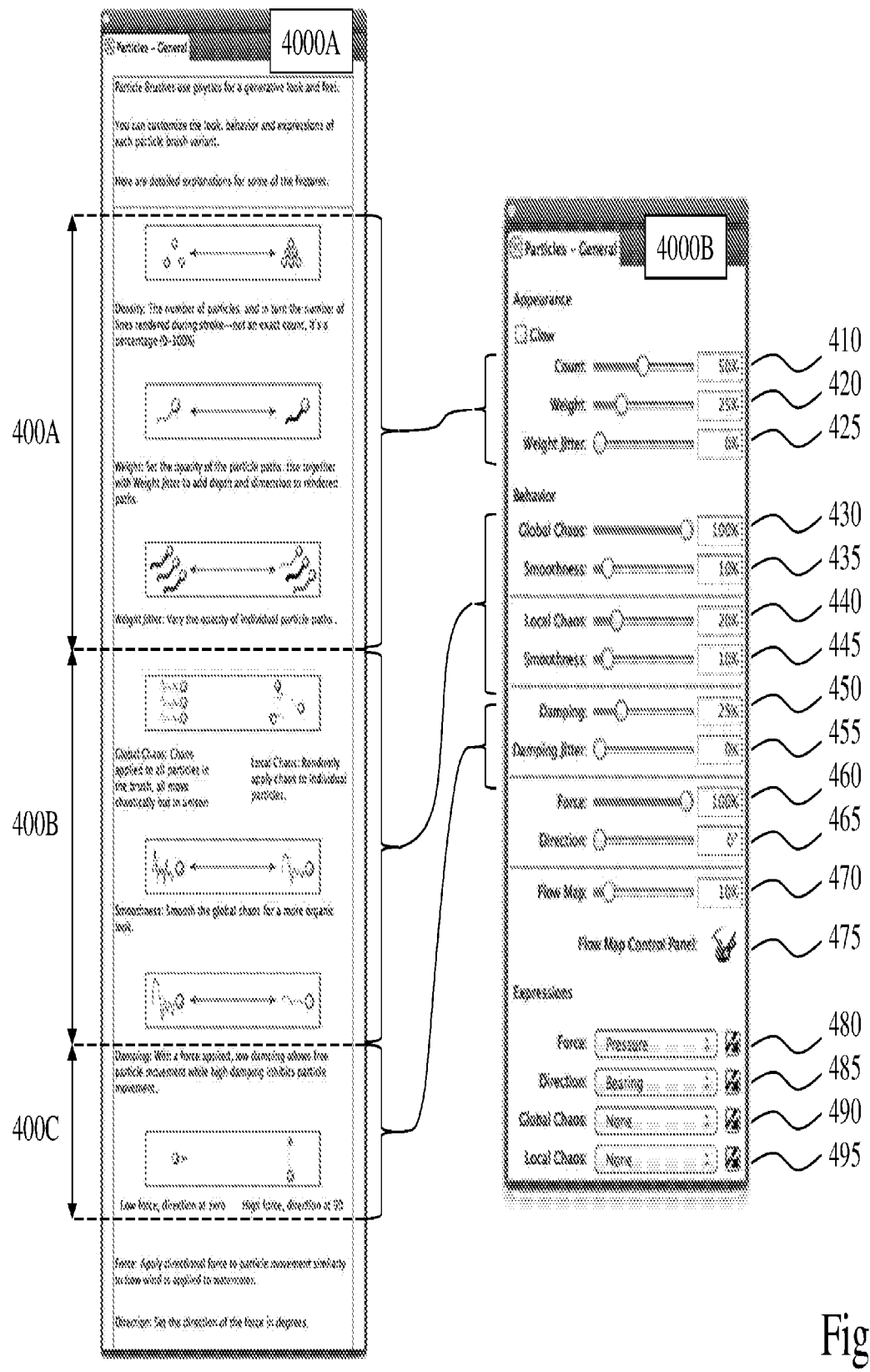
FIG. 4A depicts user help screen and general particle interface for particle mark making tools according to an embodiment of the invention.

Now referring to FIG. 4A there are depicted user help screen 4000A and general particle interface 4000B for particle mark making tools according to an embodiment of the invention. As depicted user help screen 4000A provides a user with an overview of features of particle mark making tools according to embodiments of the invention. As depicted these features are split into three sections 400A to 400C respectively and are linked within FIG. 4A to the fields within general particle interface 4000B presented to the user when employing particle mark making tools according to embodiments of the invention. Accordingly, first to third fields 410 to 425 are associated with number and weight of particles as described in first section 400A, fourth to seventh fields 430 to 445 with particle chaos as described in second section 400B, and eighth to ninth fields 450 and 455 relating to particle damping and as described in third section 400C.

In summary the fields within general particle interface 4000B are:

| | | |
|---|---|---|
| First field 410 | Count | Adjusts number of particles and hence the number of paths rendered during a stroke of the mark making tool. |
| Second field 420 | Weight | Adjusts opacity of individual particle paths within the mark. |
| Third field 425 | Weight Jitter | Degree of randomness added to opacity of individual particle paths within the mark. |
| Fourth field 430 | Global Chaos | Degree of randomness applied to particle set overall so that move chaotically but in unison. |
| Fifth field 435 | Smoothness | Degree of smoothing applied to global chaos. |
| Sixth field 440 | Local Chaos | Degree of randomness applied to each particle individually within the mark. |
| Seventh field4 45 | Smoothness | Degree of smoothing applied to local chaos. |
| Eighth field450 | Damping | Damping/inertia of particles to an applied force inducing their motion such that low damping allows particles to move faster and be more responsive to forces affecting their movement whilst high damping reduces forces acting and particle movement is slower/heavier. |

| | | |
|---|---|---|
| Ninth field 455 | Damping Jitter | Variability in damping/inertia with the set of particles |
| Tenth field 460 | Force | Applies a global directional force to all particle movement, and can be considered an effect such as wind, fluid flow, uniform gravity etc. |
| Eleventh field 465 | Direction | Allows direction of the force to be specified. |
| Twelfth field 470 | Flow (Force) Map | Adjusts the weighting applied to a stored map of force which may be applied to the particle set during motion of the mark making tool, e.g. local gravity variations etc. |
| Thirteenth field 475 | Flow Map Control Panel | Allows selection of the force map from presets and/or user generated or selected images. |
| Fourteenth field 480 | Expression - Force | Allows the force value to be dynamically controlled through an expression factor. |
| Fifteenth field 485 | Expression - Direction | Allows the direction value to be dynamically controlled through an expression factor. |
| Sixteenth field 490 | Expression - Global Chaos | Allows the global chaos value to be dynamically controlled through an expression factor. |
| Seventeenth field 495 | Expression - Local Chaos | Allows the local chaos value to be dynamically controlled through an expression factor. |

A force (flow) map as described and depicted in respect of Expressions may include, but are not limited to, velocity (i.e. speed of user stroke motion), direction, pressure (e.g., stylus upon tablet measuring pressure/force as well as location, motion, wheel, tilt, bearing, rotation, source of the gesture, and random. It would also be evident that other expressions, and a source of the gesture, may be employed including, but not be limited to, accelerometer or accelerometer derived data, tracked motion of a user or a predetermined portion of a user, an external image or image source, an external audiovisual source or audiovisual content, an external multimedia source or multimedia content, biometric data of a user, and an item of environmental data.

Figure 4B:
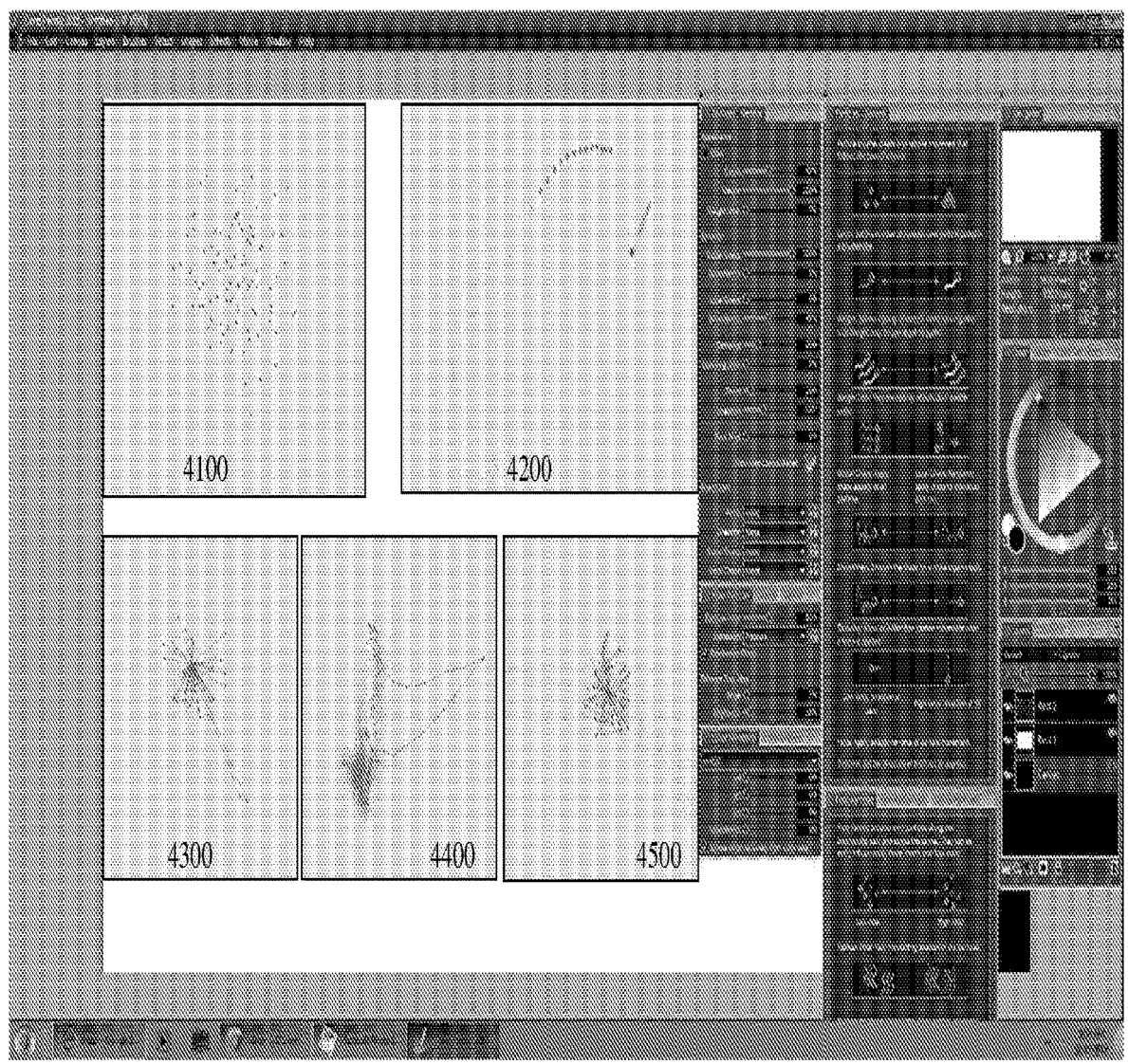
FIG. 4B depicts examples of particle mark making tools according to an embodiment of the invention.

Referring to FIG. 4B there are depicted examples of particle mark making tools according to an embodiment of the invention. Such particle mark making tools are physics-inspired mark making tools that emit particles from a predetermined point, e.g. the centre, and the particles draw a pattern of lines (paths) as they cross the working area (e.g. screen or virtual canvas). As depicted there are three types of particle mark making tools, namely flow 4100, gravity 4200, and spring embodied by first to third spring tools 4300 to 4500 respectively which depict radial, ring, and mesh particle distributions. It would be evident that other particle spring configurations may be employed according to embodiments of the invention including, for example, those derived from geometric shapes, geometric patterns, and user defined shapes. Similarly, the gravity 4200 may employ alternate particle configurations such as those depicted in first to third spring tools 4300 to 4500 respectively as well as others not depicted as would be evident to one skilled in the art. It would be further evident that other physical forces and effects may be employed within alternate particle mark making tools according to embodiments of the invention including, for example, magnetism, electromagnetism, pendula, and gears/chains. Further, such particle mark making tools are examples of physics-inspired or physical effect controlled mark making tools according to embodiments of the invention that either emit particles from a point or points, e.g. the centre, or the particles form part of a grouping then these may generate a pattern of points, isolated elements, paths, patterns of lines, mesh, mesh fills, or other rendering methods as they and their associated mark making tools cross the working area, e.g. the display screen and/or virtual canvas.

Figure 5:
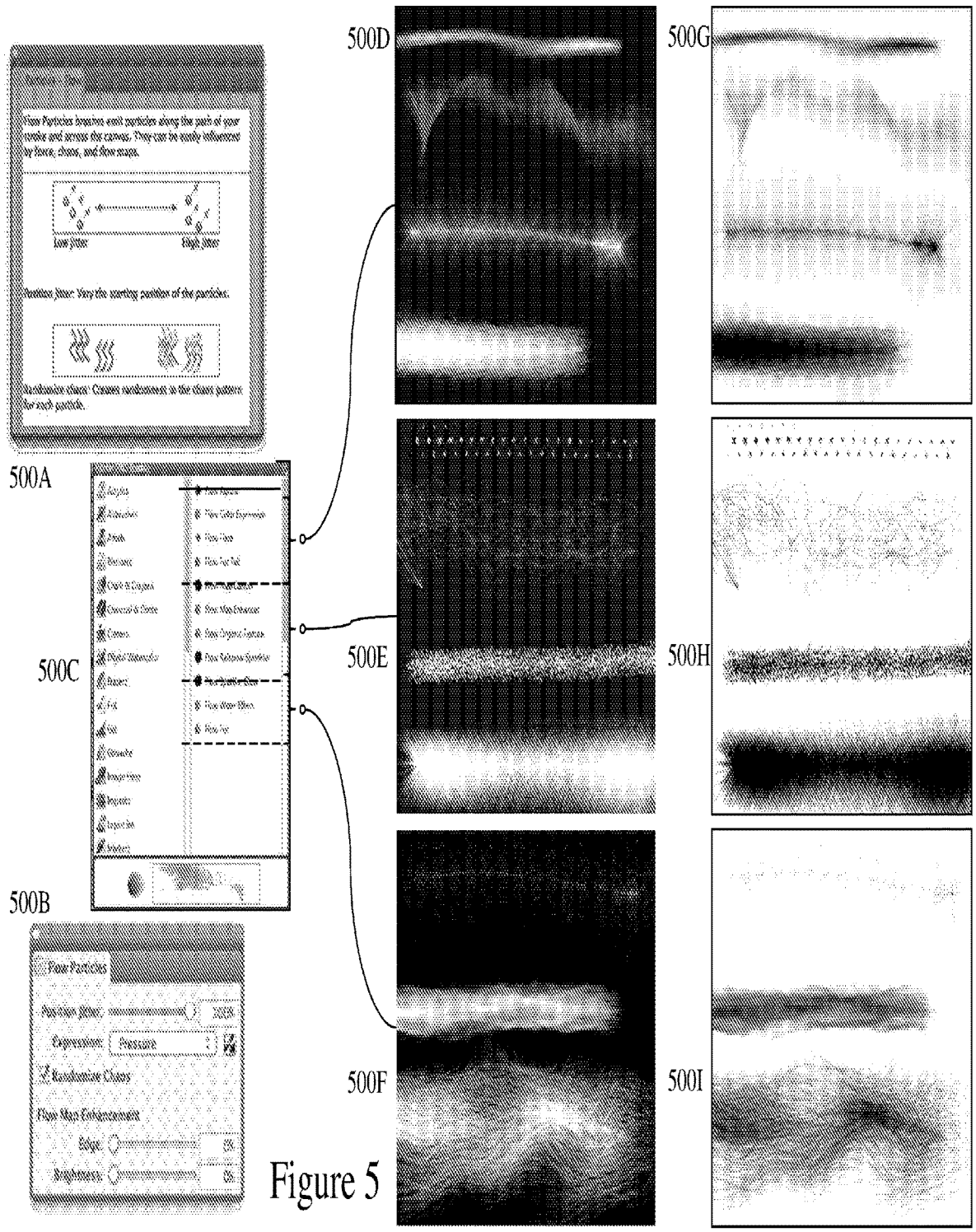
FIG. 5 depicts examples of flow particle mark making tool presets according to embodiments of the invention within a digital graphics editor, digital painting, application.

Referring to FIG. 5 there are depicted examples of flow particle mark making tool presets according to embodiments of the invention within a GESGEAP. As depicted in first to third images 500A to 500C flow particle mark making tools are basically defined within the embodiment of the invention depicted by a position jitter and chaos (first image 500A) wherein the positional jitter, an expression of positional jitter, and flow map characteristics are set through a flow menu depicted in second image 500B. Third image 500C depicts a list of flow particle mark making tool presets according to embodiments of the invention which are then depicted in negative in fourth to sixth images 500D to 500F respectively and positive in seventh to ninth images 500G to 500I respectively. These being entitled:

Flow Aurora;
Flow Colour Expression;
Flow Flare;
Flow Map Dancer;
Flow Map Enhancer;
Flow Organic Texture;
Flow Rainbow Sprinkler;
Flow Sparkler Glow;
Flow Water Effect; and
Flow Fur.

Accordingly, each flow particle mark making tool preset in addition to setting the flow menu depicted in second image 500B sets the count, weight, weight jitter, global chaos, smoothness, local chaos, smoothness, damping, damping jitter, force, and direction within the particle general menu such as depicted supra in general particle interface 4000B in FIG. 4A. Optionally, flow particle mark making tool presets may differ only in settings within the flow menu 500B or general particle interface 4000B rather than both.

Figure 6:
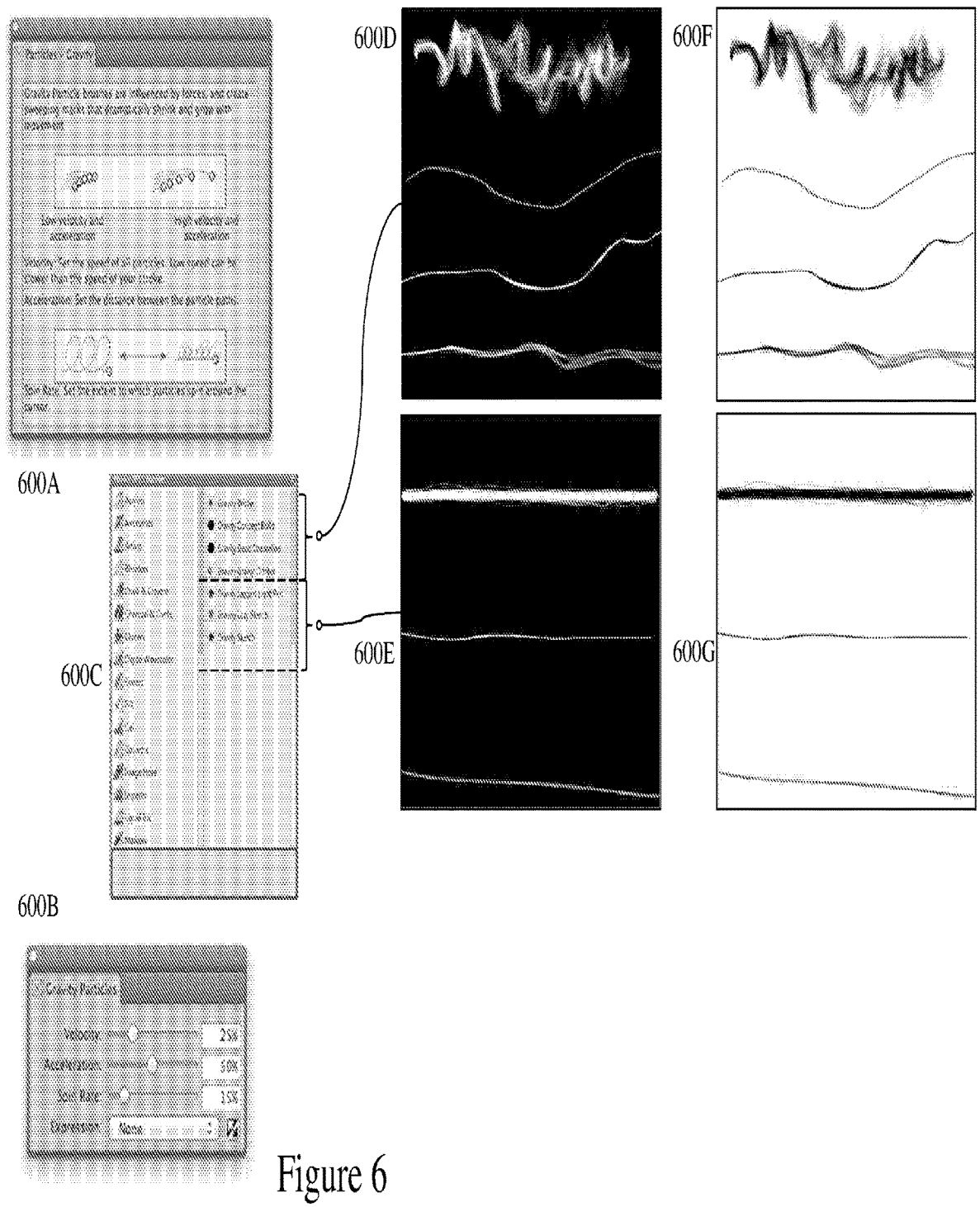
FIG. 6 depicts examples of gravity particle mark making tool presets according to embodiments of the invention within a digital graphics editor, digital painting, application.

FIG. 6 depicts examples of gravity particle mark making tool presets according to embodiments of the invention within a GESGEAP. As depicted in first to third images 600A to 600C gravity particle mark making tools are basically defined within the embodiment of the invention depicted by velocity, acceleration, and spin rate (first image 600A) wherein the velocity, acceleration, and spin rate are set through a gravity particle menu depicted in second image 600B. Third image 600C depicts a list of gravity particle mark making tool presets according to embodiments of the invention which are then depicted in negative in fourth to fifth images 500D and 500E respectively and positive in sixth and seventh images 600F and 600G respectively. These being entitled:

Gravity Bristle;
Gravity Concept Build;
Gravity Deco Streamline;
Gravity Grainy Orbiter;
Gravity Jagged Light Pen;
Gravity Lazy Sketch; and
Gravity Sketch.

Accordingly, each gravity particle mark making tool preset in addition to setting the gravity particle menu depicted in second image 600B sets the count, weight, weight jitter, global chaos, smoothness, local chaos, smoothness, damping, damping jitter, force, and direction within the particle general menu such as depicted supra in general particle interface 4000B in FIG. 4A. Optionally, gravity particle mark making tool presets may differ only in settings within the gravity particle menu 600B or general particle interface 4000B rather than both.

Figure 7:
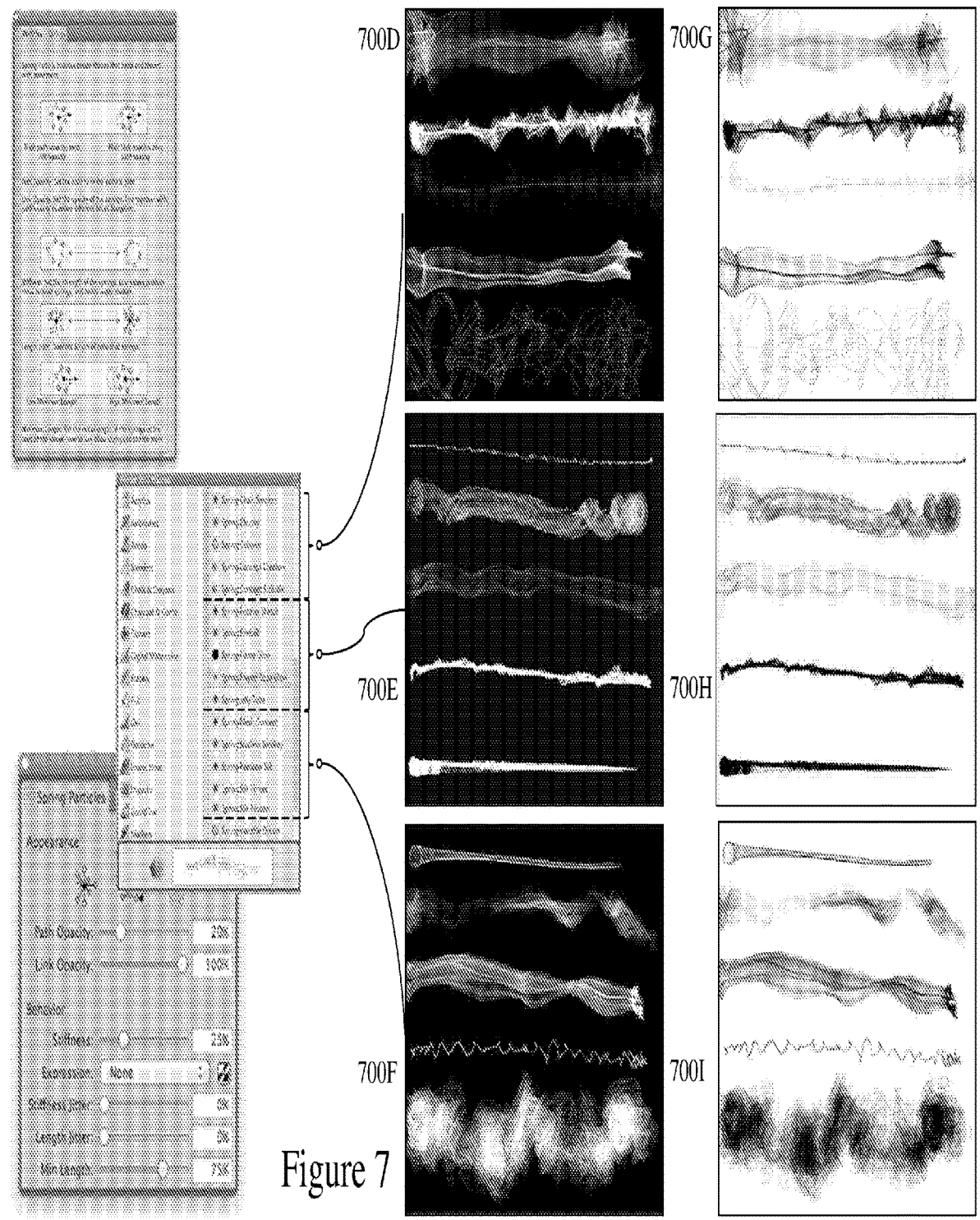
FIG. 7 depicts examples of spring based mark making tool presets according to embodiments of the invention within a digital graphics editor, digital painting, application.

FIG. 7 depicts examples of spring based mark making tool presets according to embodiments of the invention within a GESGEAP. As depicted in first to third images 700A to 700C spring particle mark making tools are basically defined within the embodiment of the invention depicted by path opacity, link opacity, stiffness of springs, length jitter of individual springs, and minimum spring length (first image 700A) wherein the path opacity, link opacity, stiffness of springs, length jitter of individual springs, and minimum spring length characteristics are set through a spring particle menu depicted in second image 700B together with the format of the spring particle set, as in radial, ring, or mesh, such as described supra in respect of first to third spring tools 4300 to 4500 respectively in FIG. 4B. Third image 700C depicts a list of spring particle mark making tool presets according to embodiments of the invention which are then depicted in negative in fourth to sixth images 700D to 700F respectively and positive in seventh to ninth images 700G to 700I respectively. These being entitled:

Spring Chain Smokey;
Spring Chunky;
Spring Cobweb;
Spring Concept Creature;
Spring Concept Scribble;
Spring Feather Sketch;
Spring Fireball;
Spring Flame Glow;
Spring Frayed Rope Glow;
Spring Jelly Tube;
Spring Mesh Concept;
Spring Nucleus Smokey;
Spring Rainbow Silk;
Spring Silk Flower;
Spring Silk Ribbon; and
Spring Variable Dream.

Accordingly, each spring particle mark making tool preset in addition to setting the spring menu depicted in second image 500B sets the count, weight, weight jitter, global chaos, smoothness, local chaos, smoothness, damping, damping jitter, force, and direction within the particle general menu such as depicted supra in general particle interface 4000B in FIG. 4A. Optionally, spring particle mark making tool presets may differ only in settings within the flow menu 500B or general particle interface 4000B rather than both.

Figure 8:
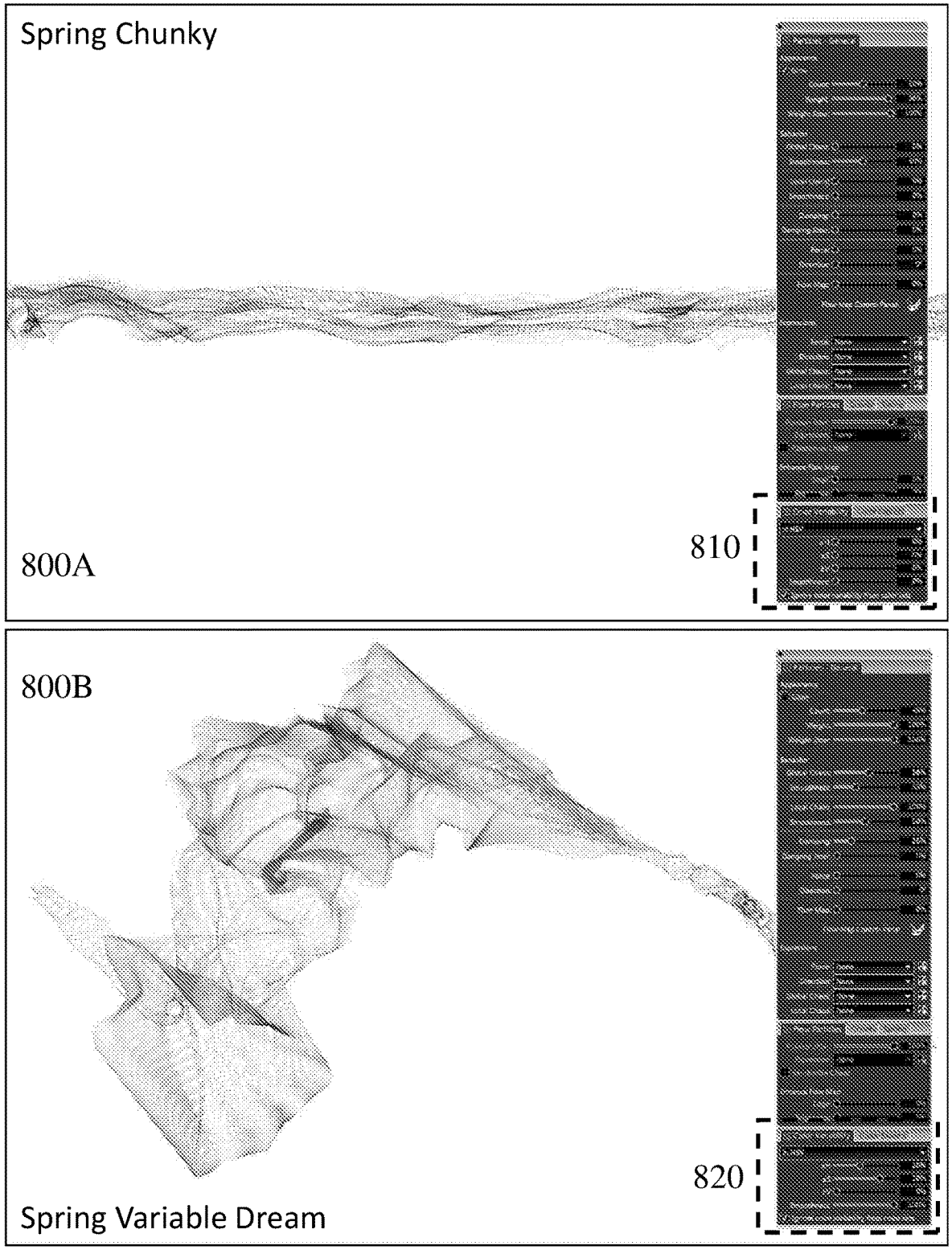
FIG. 8 depicts examples of marks generated by a pair of spring based mark making tool presets according to embodiments of the invention within a digital graphics editor, digital painting, application.
Figure 9A:
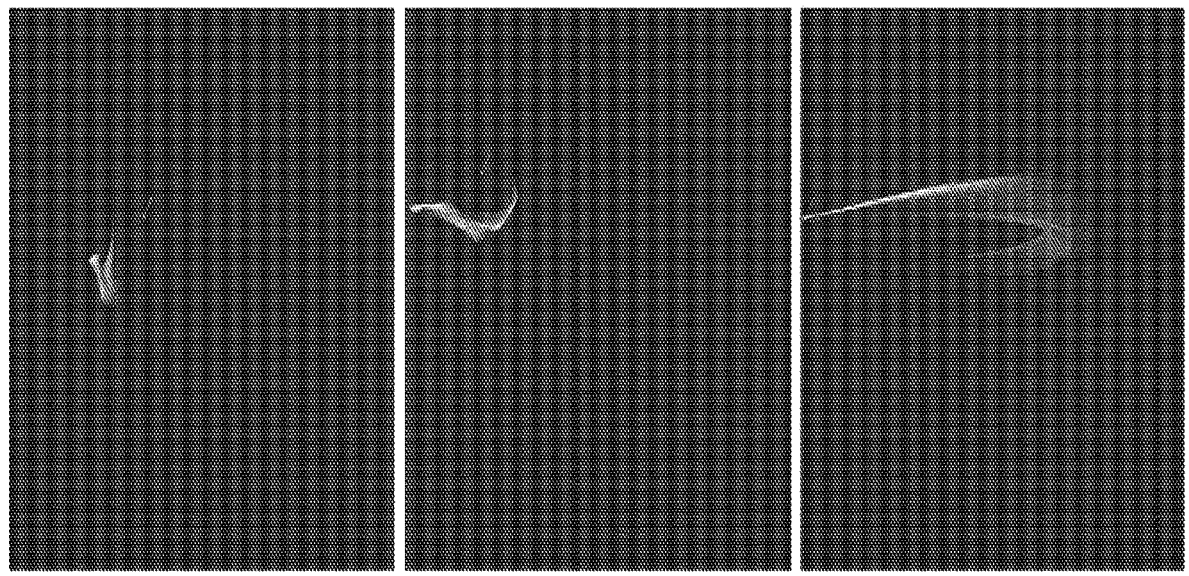
FIG. 9A depicts an effect of an expression, force, upon a flow particle mark making tool according to an embodiment of the invention within a digital graphics editor, digital painting, application.

Examples of marks generated by a pair of spring based mark making tool presets according to embodiments of the invention within a GESGEAP are depicted in FIG. 8 for the "Spring Chunky" 800A and "Spring Variable Dream" 800B presets together with their general particle interfaces where it can be seen that the tools differ primarily in global and local chaos. Whilst they are depicted in black and white it would not be apparent to a reader of the specification that the two also differ in their treatment of colour as evident from the first and second colour variability menu settings for the "Spring Chunky" 800A and "Spring Variable Dream" 800B respectively.

Figure 9B:
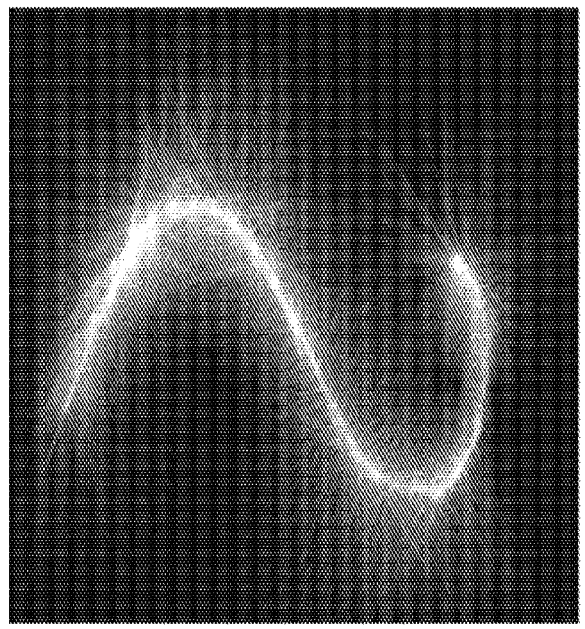
FIG. 9B depicts the effects of position jitter and randomized chaos on flow particle mark making tool strokes according to an embodiment of the invention within a digital graphics editor, digital painting, application.
Figure 9B:
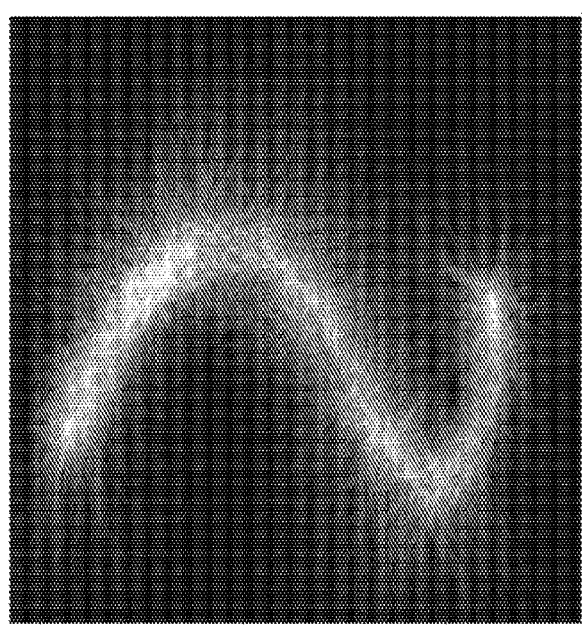
Figure 9B:
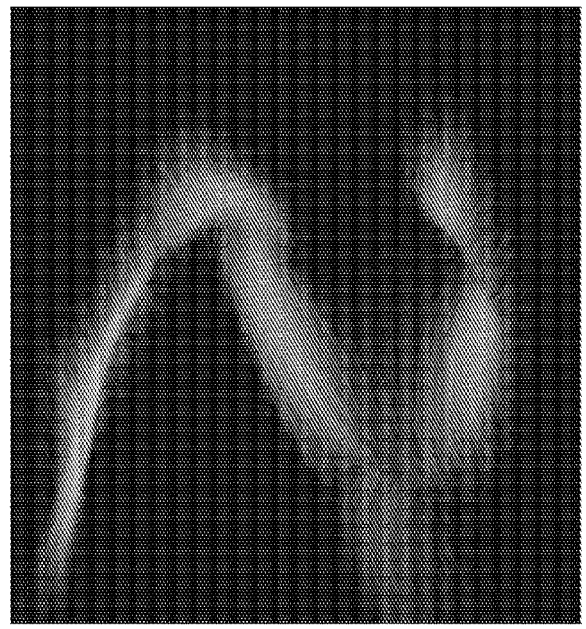
Figure 9B:
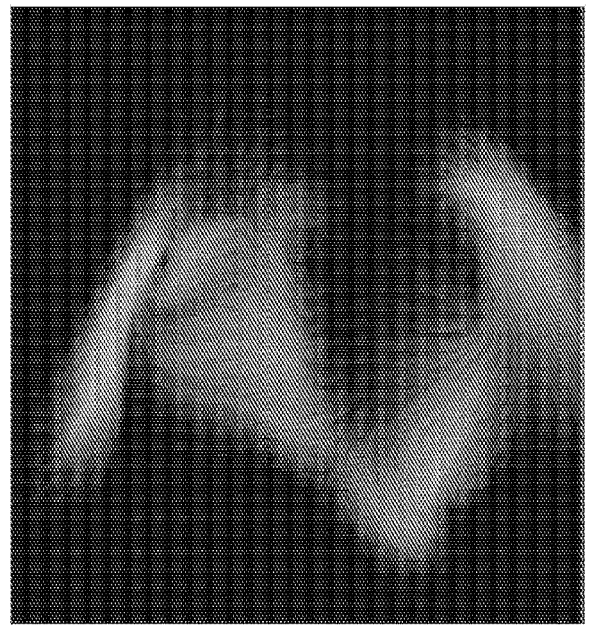

Flow particle mark making tools emit short-lived particles which "flow" from the centre of the mark making tool across the workspace and gradually fade. In effect they may be considered to resemble rockets or fireworks which as they flow encounter forces that change their path resulting in chaotic or controlled movement according to the force and its characteristics. Alternatively, they may be thought of as short-lived particles of a fluid. As such flow mark making tools are easily influenced by force, chaos, and flow maps as evident from the figures and descriptions below. As evident from the flow menu depicted in second image 500B in FIG. 5 specific flow particle mark making tool controls include:

Position Jitter—allows the starting position of the particles to be varied as evident from first and second images 900D and 900E in FIG. 9B respectively for low and high position jitter settings respectively. Further this may be linked to an expression;

Randomize Chaos—allows the chaos applied to the flow particles to be randomized for a more organic look as evident from third and fourth images 900F and 900G respectively with randomized chaos off and on respectively; and Enhance Flow Map—including Edge and Brightness sliders which modify the mark making tool stroke based upon the edge and brightness of the flow map selected.

Now referring to FIG. 9B depicts an effect of an expression, force, upon a flow particle mark making tool according to an embodiment of the invention within a GESGEAP. As depicted in first to third images 900A to 900B the value of force for a mark making tool preset was varied at 0%, 50%, and 100% values. Accordingly, for approximately similar motion in the user's stroke the resulting movement of the particles within a flow particle mark making tool can be seen to increase as the effective force applied to the particles increases. Optionally, the force may be subject to an expression such that a characteristic of the user's stroke defines the force, e.g. the direction of the stroke, the velocity of the stroke, etc. In other embodiments of the invention the force may, for example, be linked to other external controls including, but not limited, multimedia file content, audiovisual content, audio content, audio volume, pseudo-random number generator, database values, environmental parameters, and user biometric data.

Figure 10:
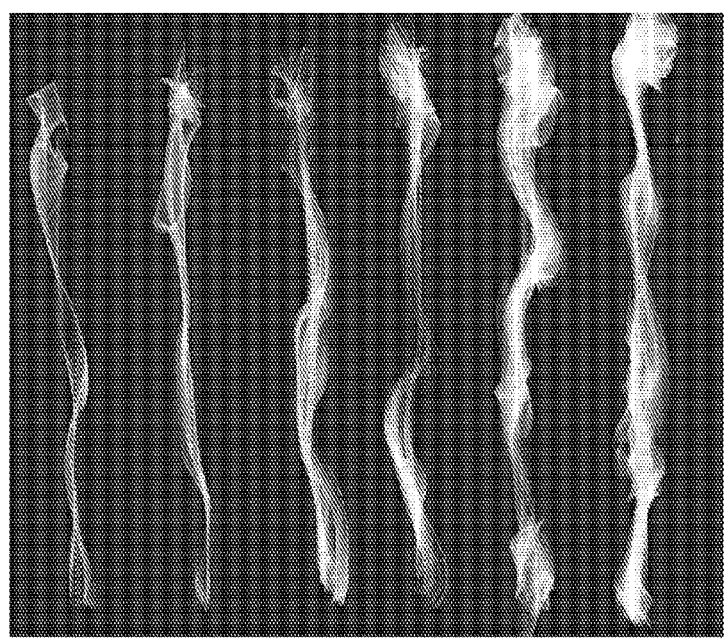
FIG. 10 depicts an effect of particle count upon a flow particle mark making tool according to an embodiment of the invention within a digital graphics editor, digital painting, application.

Referring to FIG. 10 depicts an effect of particle count upon a flow particle mark making tool according to an embodiment of the invention within a GESGEAP as the count is varied at 10%, 20%, 40%, 60%, 80% and 100% wherein the weight jitter was set to 50%. Accordingly, the count sets the number of particles in a mark making tool stroke and hence the number of paths rendered during the mark making tool stroke. Particle count is a control common to all particle mark making tools described within this specification, flow, gravity and spring. With other mark making tools rendering according to other physical and/or non-physical rules particle count may or may not be a control. It would be evident that the actual setting of the particle count may be set at any integer value between 0% and 100% or alternatively the range may be specified by other means and/or the user may enter either a range value numerically or the count directly numerically.

Figure 11:
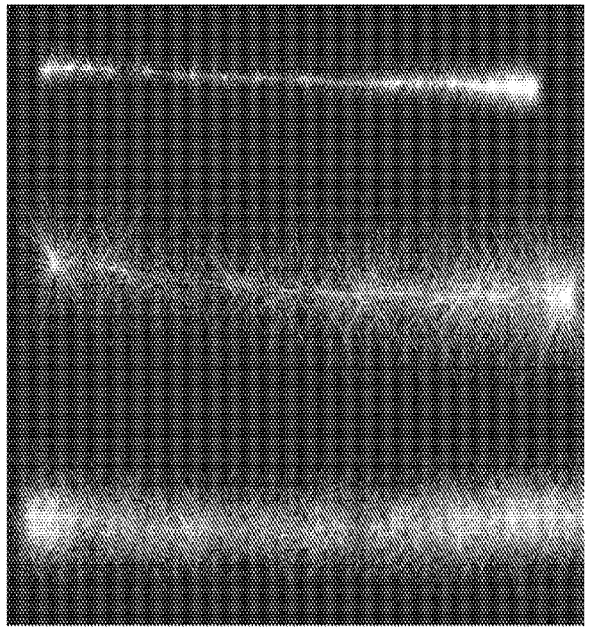
FIGS. 11 to 14 depicts the effect of global and local chaos onto a flow particle mark making tool according to an embodiment of the invention within a digital graphics editor, digital painting, application.
Figure 12:
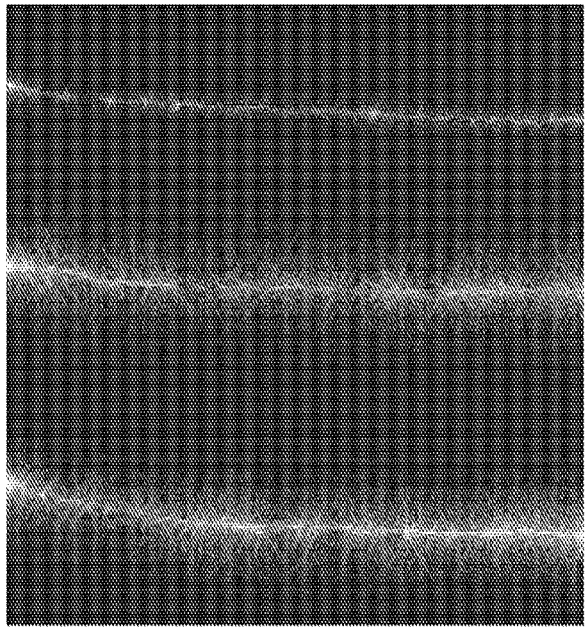
Figure 13:
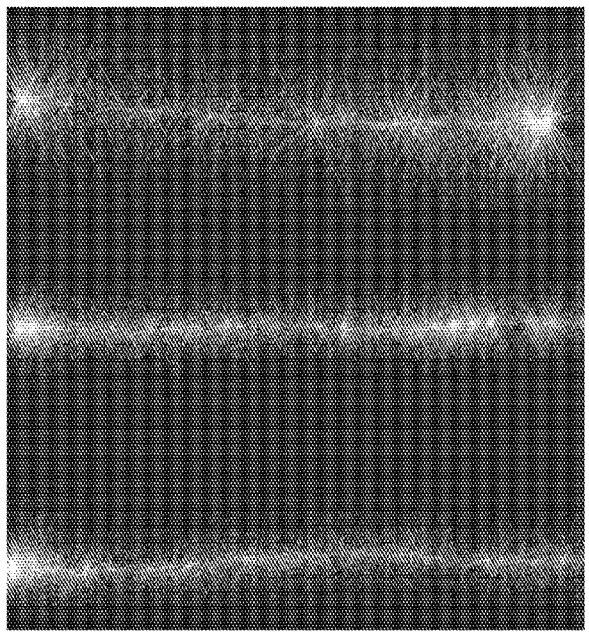
Figure 14:
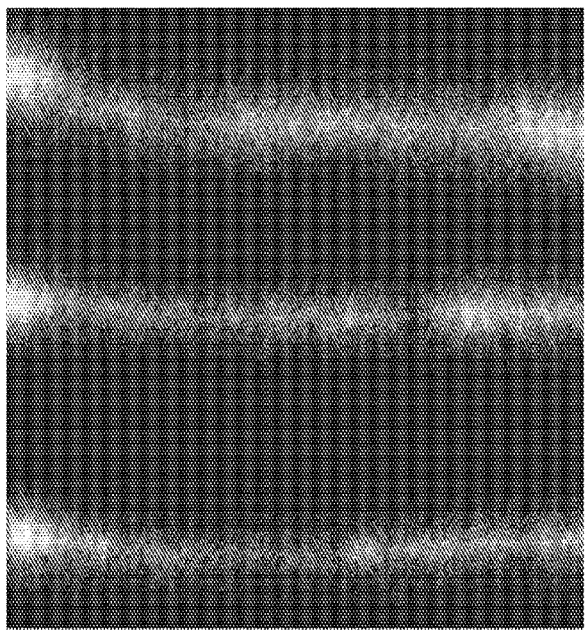

Similarly, all particle mark making tools described within this specification, flow, gravity and spring, also share global chaos and local chaos as common controls. Global chaos refers to the chaos applied to all particles equally so that they move chaotically but in unison. Local chaos then applies chaos randomly to individual particles within the mark making tool. Each of the global chaos and local chaos also has an associated smoothing control for smoothing the chaos for a more organic look and each of the global and local chaos may be associated with an expression, e.g. global chaos may be direction of controller motion whilst local chaos is velocity of controller or vide-versa or other combinations according to the characteristics of the mark making tool controller. As such referring to FIGS. 11 to 14 there are depicted the effects of global and local chaos onto a flow particle mark making tool, Flow Flare, according to an embodiment of the invention within a GESGEAP, wherein for each from upper to lower the settings were for <GlobalChaos:LocalChaos>:

| Figure 11 | < 0% : 0% > | < 50% : 0% > | < 100% : 0% >; |
|---|---|---|---|
| Figure 12 | < 50% : 0% > | < 50% : 50% > | < 50% : 100% >; |
| Figure 13 | < 100% : 0% > | < 100% : 50% > | < 100% :100% >; and |
| Figure 14 | < 0% : 0% > | < 0%;50% > | < 0% : 100% > |

It would be evident that the actual setting of the global and/or local chaos values may be set at any integer value between 0% and 100% using a control such as the slider depicted in the images or alternatively the range may be specified by other means and/or the user may enter either a range value numerically or the count directly numerically.

Figure 15:
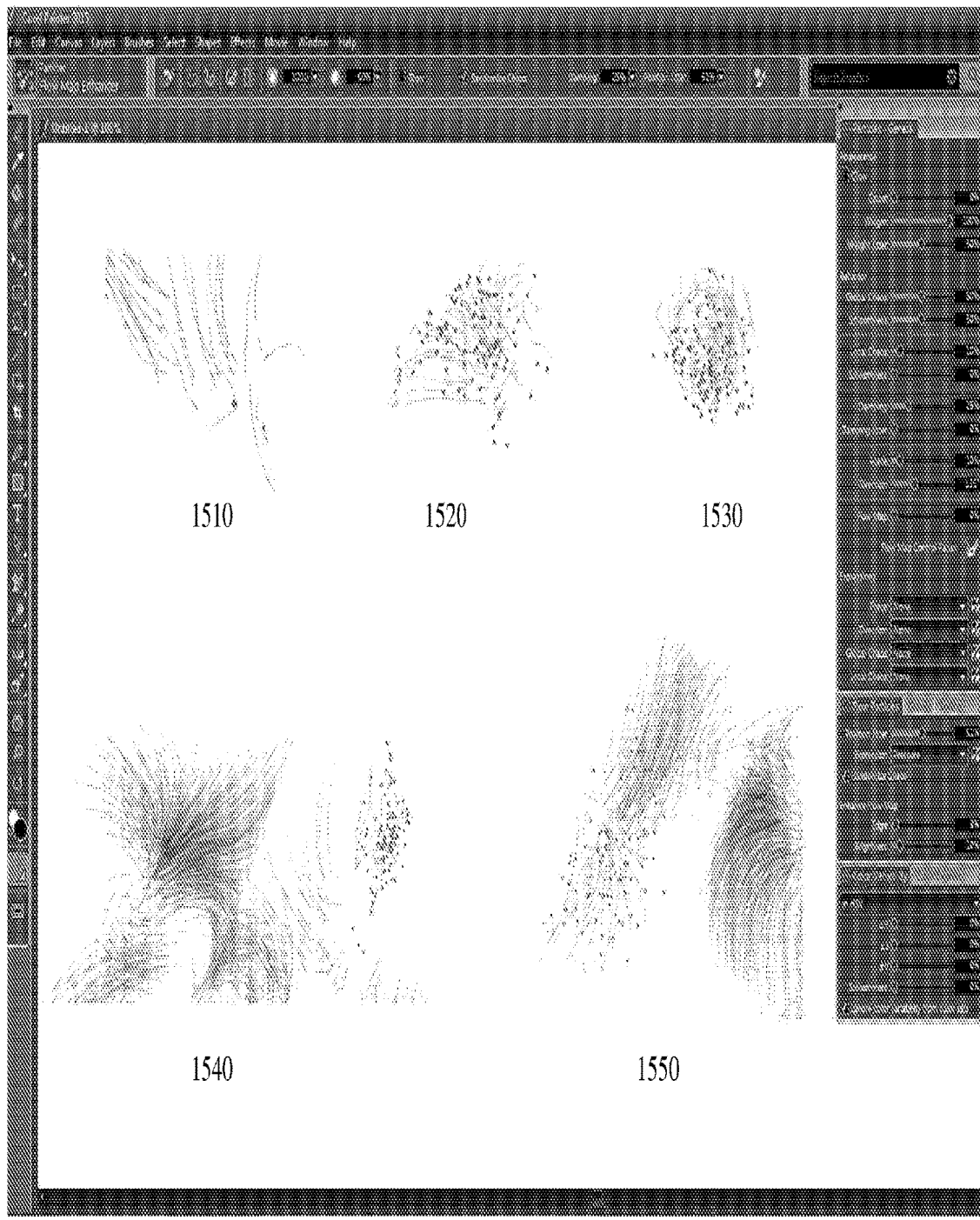
FIG. 15 depicts the particles with increasing particle count for a flow particle mark making tool according to an embodiment of the invention within a digital graphics editor, digital painting, application.

Referring to FIG. 15 depicts the particles with increasing particle count for a flow particle mark making tool according to an embodiment of the invention within a GESGEAP as the count is varied at 0%, 20%, 40%, 60%, and 100% respectively. Accordingly, the count sets the number of particles in a mark making tool stroke and hence the number of paths rendered during the mark making tool stroke. Particle count is a control common to all particle mark making tools described within this specification, flow, gravity and spring. With other mark making tools rendering according to other physical and/or non-physical rules particle count may or may not be a control. These particles are only depicted, in some embodiments of the invention, during activity with the mark making tool and are not stored and maintained although their paths are either maintained as the mark itself or influence the mark itself. However, they provide a visual indicator to the user during use of the particle mark making tool as to the effects of various common particle mark making tool controls and particle type specific particle mark making tool controls. It would be evident that the actual setting of the particle count may be set at any integer value between 0% and 100% or alternatively the range may be specified by other means and/or the user may enter either a range value numerically or the count directly numerically. However, in other embodiments of the invention the particles and/or the paths of the particles may generate a pattern of points, isolated elements, paths, patterns of lines, mesh, mesh fills, or other rendering methods as they and their associated mark making tools cross the working area, e.g. the display screen and/or virtual canvas.

Figure 16:
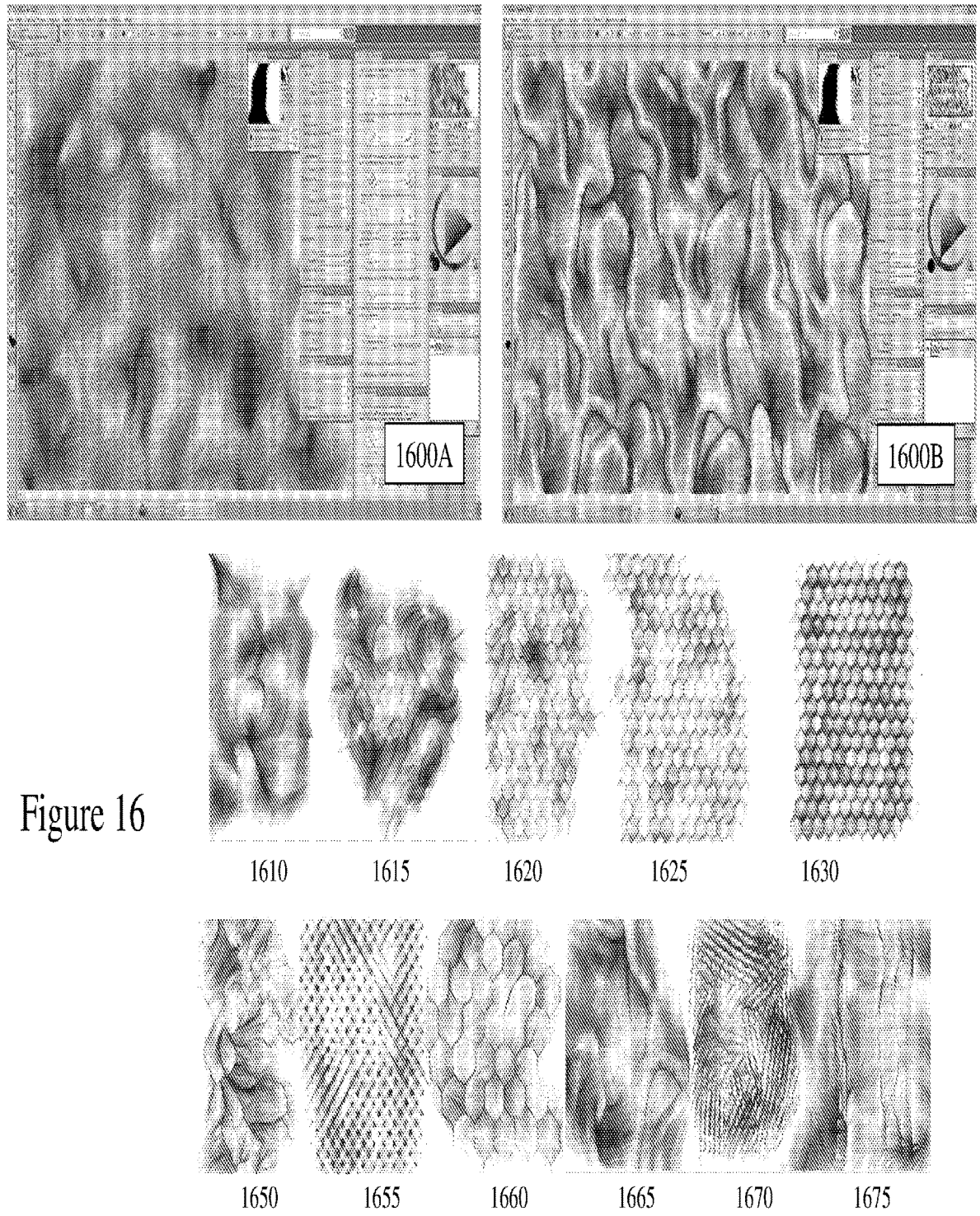
FIG. 16 depicts the effect of flow mapping upon flow particle mark making tools according to embodiments of the invention within a digital graphics editor, digital painting, application.

Now referring to FIG. 16 depicts the effect of flow mapping upon flow particle mark making tools according to embodiments of the invention within a GESGEAP. Flow maps allow the user to create textured surfaces that direct the flow of particles and hence the paths they generate. The flow map may be one from a library, e.g. paper textures, metal finishes, etc. or it may generated from scratch or based upon a variant of an existing flow map. With any such flow map the scale and contrast may be varied. First and second images 1600A and 1600B depict the application of a flow map to a Flow Fur Tail flow mark making tool with a flow map at 0% and 100% weighting wherein the effect of the flow map can be clearly seen in respect of generating the structure present within the second image 1600B. A flow (force) map may be one or more forms of digital content either stored in the appropriate format for the GESGEAP to load and employ according to its specifications, stored in a different format and converted by the GESGEAP or generated by the GESGEAP directly.

A force (flow) map as described and depicted in respect of embodiments of the invention include, but are not limited to, data associated with a one dimensional data set, two dimensional data set, or a three dimensional data set or a subset of a N-dimensional data set. For example, one dimensional data may be velocity (i.e. speed of user stroke motion), direction, pressure (e.g., stylus upon tablet measuring pressure/force as well as location, motion, wheel, tilt, bearing, rotation, source of the gesture, or randomly generated. Alternatively, a force (flow) map may be derived from an axis or multiple axis data associated with, for example, an accelerometer or accelerometer derived data, tracked motion of a user, and the tracked motion of an object or array of objects. A force (flow) map may also be derived from an external image, an external image source, a GESGEAP acquired image, external audiovisual source, external audiovisual content, external multimedia source, external multimedia content, biometric data of a user, and an item or items of environmental data. Within other embodiments of the invention the force (flow) map may be generated via a mathematical formula or mathematical formulae in which case no storage of the force (flow) map may be required although a generated "map" may be cached temporarily for use to remove the need for repeated recalculation of the force (flow) map.

Third to seventh images 1610 to 1630 respectively depict the same Flow Fur Tail mark making tool applied to a different flow map at weightings of 0%, 25%, 50%, 75%, and 100% respectively. In contrast eighth to thirteenth images 1650 to 1675 respectively depict the same Flow Fur Tail mark making tool applied to a different flow maps with constant 50% weighting. Tenth image 1660 and third to seventh images 1610 to 1630 respectively were actually generated with the same flow map but at two different scales for the tenth image 1660 and the third to seventh images 1610 to 1630 respectively.

Gravity particle mark making tools create sweeping marks that shrink and grow with movement. The particles of a gravity particle mark making tool effect the movement of planetary system such that the motion of the particles are influence by velocity, acceleration and other forces. Depending upon mark making tool stroke speed, for example, particles may stay tight within the mark making tool or they can be pulled apart by forces, inertia, etc. As such gravity particle mark making tools are influenced by forces and flow maps for example as less by chaos. In addition to the common particle mark making tool commands then as evident from the gravity flow menu depicted in second image 600B in FIG. 6 specific gravity particle mark making tool controls include:

Velocity—allows the base speed of all the particles to be set and is used in conjunction with the acceleration control to control the forward movement of the particles within the gravity mark making tool;

Acceleration—sets the distance between the gravity particle paths; and

Spin Rate—sets the speed at which gravity particles spin around the mark making tool. Slower spin rates allow the particles to track the mark making took controller closely whilst higher spin rates allow the particles to travel further away from the mark making tool controller.

Figure 17:
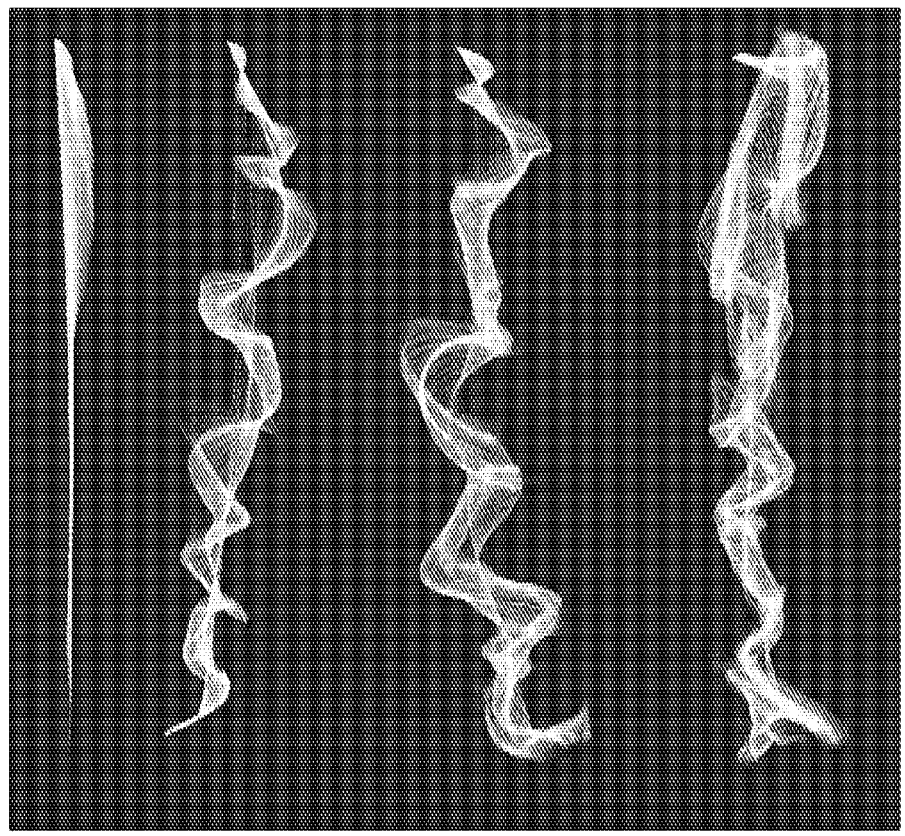
Figure 17:
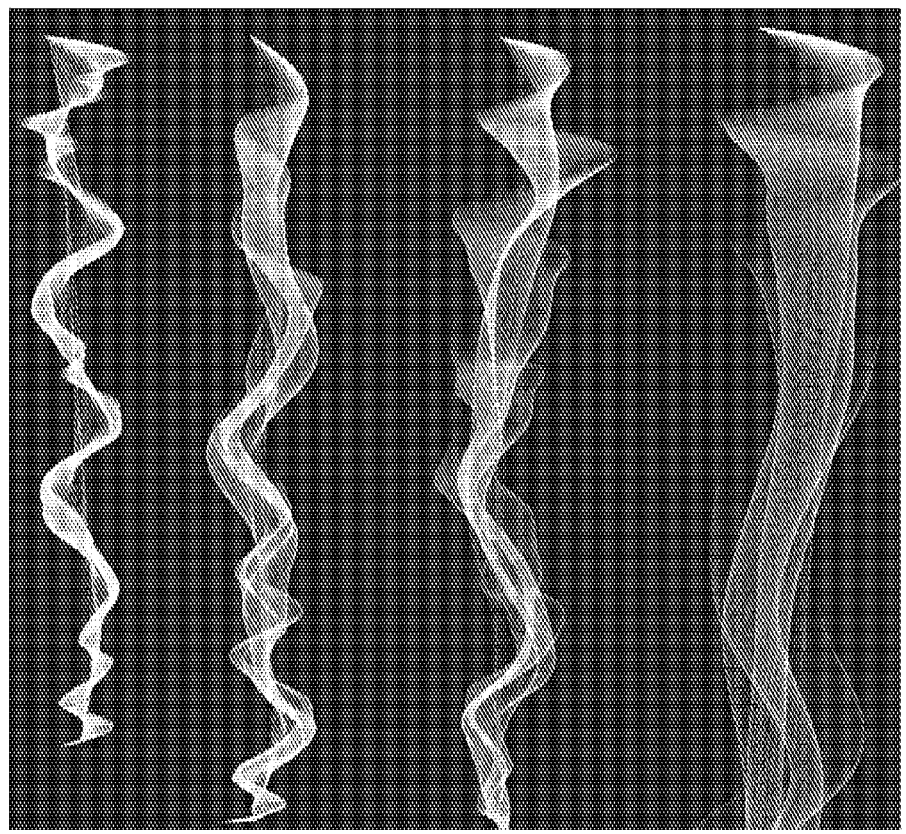

Referring to FIGS. 17 and 18 depict the effects of spin and velocity expression of spin respectively for gravity particles within a gravity particle mark making tool according to an embodiment of the invention within a GESGEAP. Within FIG. 17 in first image 1700 there are depicted Grainy Orbiter gravity mark making tool marks as the spin rate is varied from 0% to 30%, 60%, and 100%. Second image 1750 depicts the same Grainy Orbiter gravity mark making tool marks but now with the expression velocity applied to spin as the mark making tool controller is moved from slow to fast (left to right). In FIG. 18 depict a mark making tool mark for low velocity and acceleration in first image 1800A and with high velocity and acceleration in second image 1800B. Similarly, third image 1800C depicts a mark making tool mark set to low spin rate whilst fourth image 1800D depicts the same mark making tool but at high spin rate.

Figure 19:
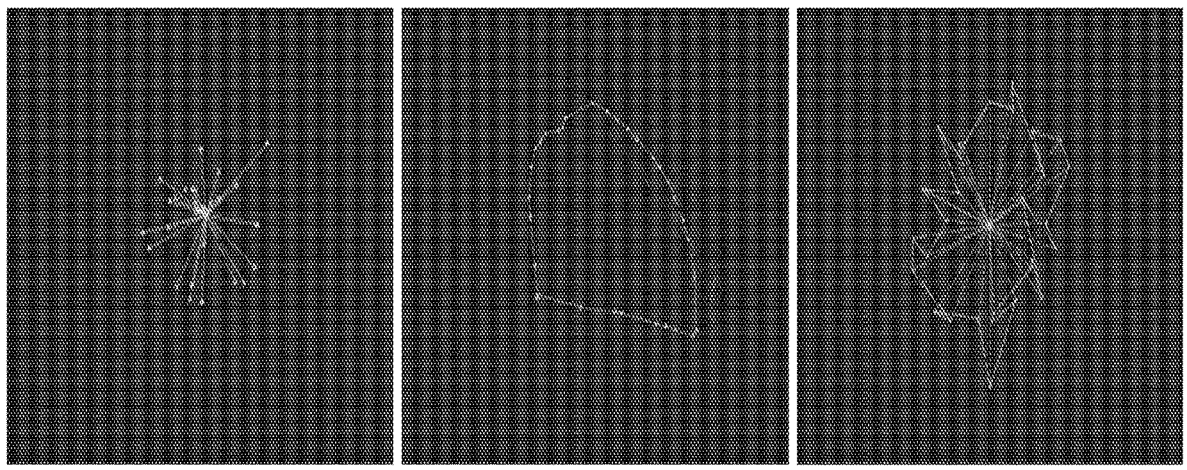
FIG. 19 depicts spring particle configurations for spring particle mark making tools according to embodiments of the invention within a digital graphics editor, digital painting, application.

Now referring to FIG. 19 there are depicted spring particle configurations for spring particle mark making tools according to embodiments of the invention within a GESGEAP wherein these are radial 1910, ring 920, and mesh 1930. These spring particle mark making tool configurations represent just three of a plurality of designs wherein a set of particles are held together by elastic springs. As such spring particle mark making tools create marks that do not spread out across the workspace but rather absent any other force or controller action bounce back towards the centre of the mark making tool. The characteristics of the mark making tool exploiting spring particles is determined both by the number and interconnection of the particles but also the stiffness/flexibility of the springs between adjacent particles. Within the presets described with respect to embodiments of the invention the interconnection of particles is predefined. However, optionally a user may define the interconnections and/or import a particle sequence defining the particles and their interconnections.

In addition to the common particle mark making tool commands then as evident from the spring particle menu depicted in second image 700B in FIG. 7 specific spring particle mark making tool controls include:

Appearance—allows the design, for example, to be radial (nucleus) 1910, ring (chain) 1920, and mesh (geometric) 1930;

Path Opacity sets the opacity of the particle paths, i.e. the mark that each particle makes as part of the spring particle mark making tool;

Spring Opacity sets the opacity of the springs between the particles, i.e. invisible=0%, full opacity=100%;

Stiffness allows the user to control the strength of the springs wherein low values produce more relaxed spring which allow the particles to move more freely in relation to one another. Stiffness can also be associated with an expression.

Stiffness Jitter establishes variability in the stiffness of the springs such that the jitter is applied to all springs yielding a series of interconnections with varying stiffness;

Length Jitter provides a random variation in the length of the springs between particles; and Minimum Length establishes an initial length for the springs.

Figure 20:
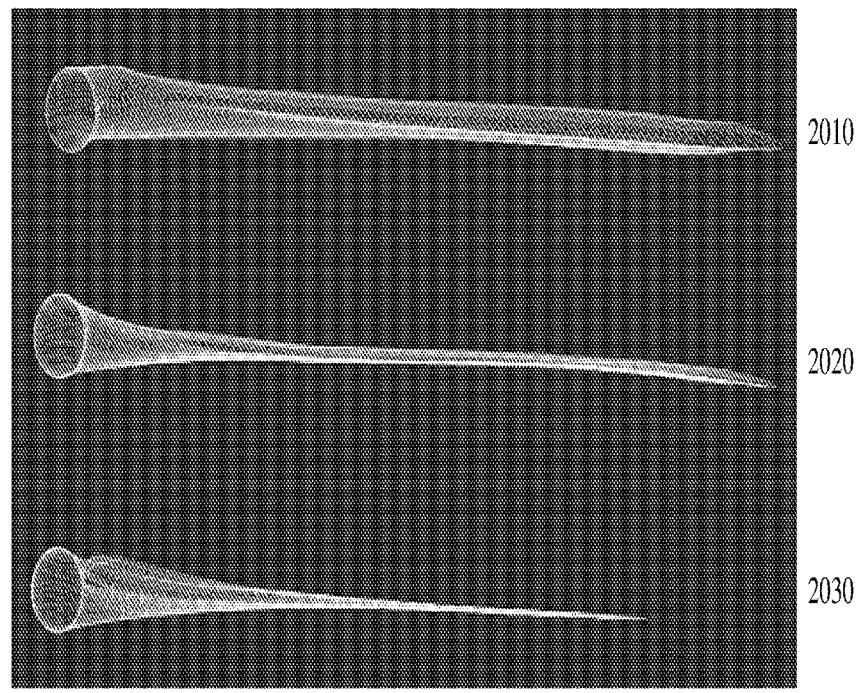
FIG. 20 depicts the effect of spring stiffness upon a mesh spring particle mark making tools according to embodiments of the invention within a digital graphics editor, digital painting, application.
Figure 21A:
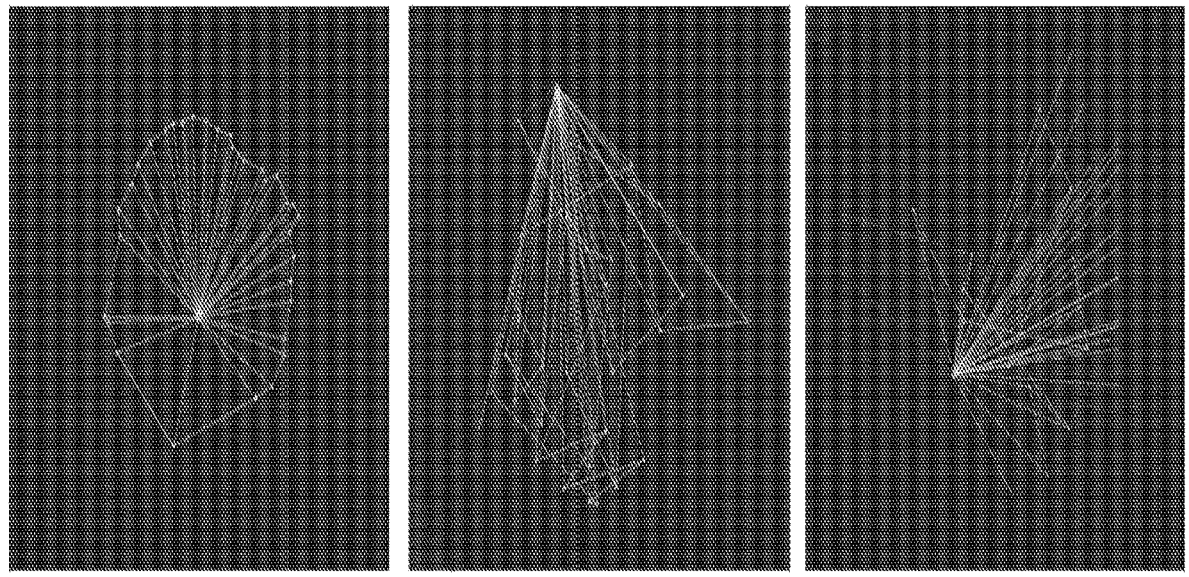
FIG. 21A depicts the effect of global chaos upon a mesh spring particle mark making tools according to embodiments of the invention within a digital graphics editor, digital painting, application.

Referring to FIG. 20 depicts the effect of spring stiffness upon a mesh spring particle mark making tools according to embodiments of the invention within a GESGEAP as the spring stiffness is varied from 100% to 50% to 0% in first to third images 2010 to 2030 respectively. As spring stiffness reduces then the mark collapses under motion. Now referring to FIG. 21A there is depicted the effect of global chaos upon a mesh spring particle mark making tools according to an embodiment of the invention within a GESGEAP wherein the global chaos is increased from 100% to 50% to 0% in first to third images 2110 to 2130 respectively. Accordingly, as the mark making tool is moved with low stiffness the particles take time to react and respond unlike the case where the springs have high stiffness as evident in fourth and fifth images 2110D and 2110E respectively where a mesh spring particle mark making tool is moved with low stiffness in fourth image 2110D and high stiffness in 2110E such that in the latter the resulting mark is tighter to the stroke of the mark making tool than in fourth image 2110D wherein as the mark making tool changes direction particles do not react as quickly maintaining their trajectory and leading to larger more open mark.

Now referring to FIG. 21B there are depicted the effects of effects of opacity and spring length upon a spring particle mark making tools according to embodiments of the invention within a GESGEAP. Accordingly, first and second images 2170 and 2175 respectively depict mark making tool strokes of a stiff ring mesh for high path opacity—low spring opacity and low path opacity—high spring opacity respectively. Accordingly, surfaces can be shown essentially in different manners through simple adjustment of opacity. Also depicted in FIG. 21B are the effects of length jitter upon a mark making tool impression wherein third image 2180 depicts an impression made with a mark making tool with low length jitter and fourth image 2185 depicts an impression made with a mark making tool with high length jitter wherein it is evident that the increasing length jitter results in a non-uniform ring mark making tool compared with nearly circular mark making tool generating the impression in third image 2180C. Fifth and sixth images 2190 and 2195 respectively depict the effect of spring length on the mark making tool.

Figure 22:
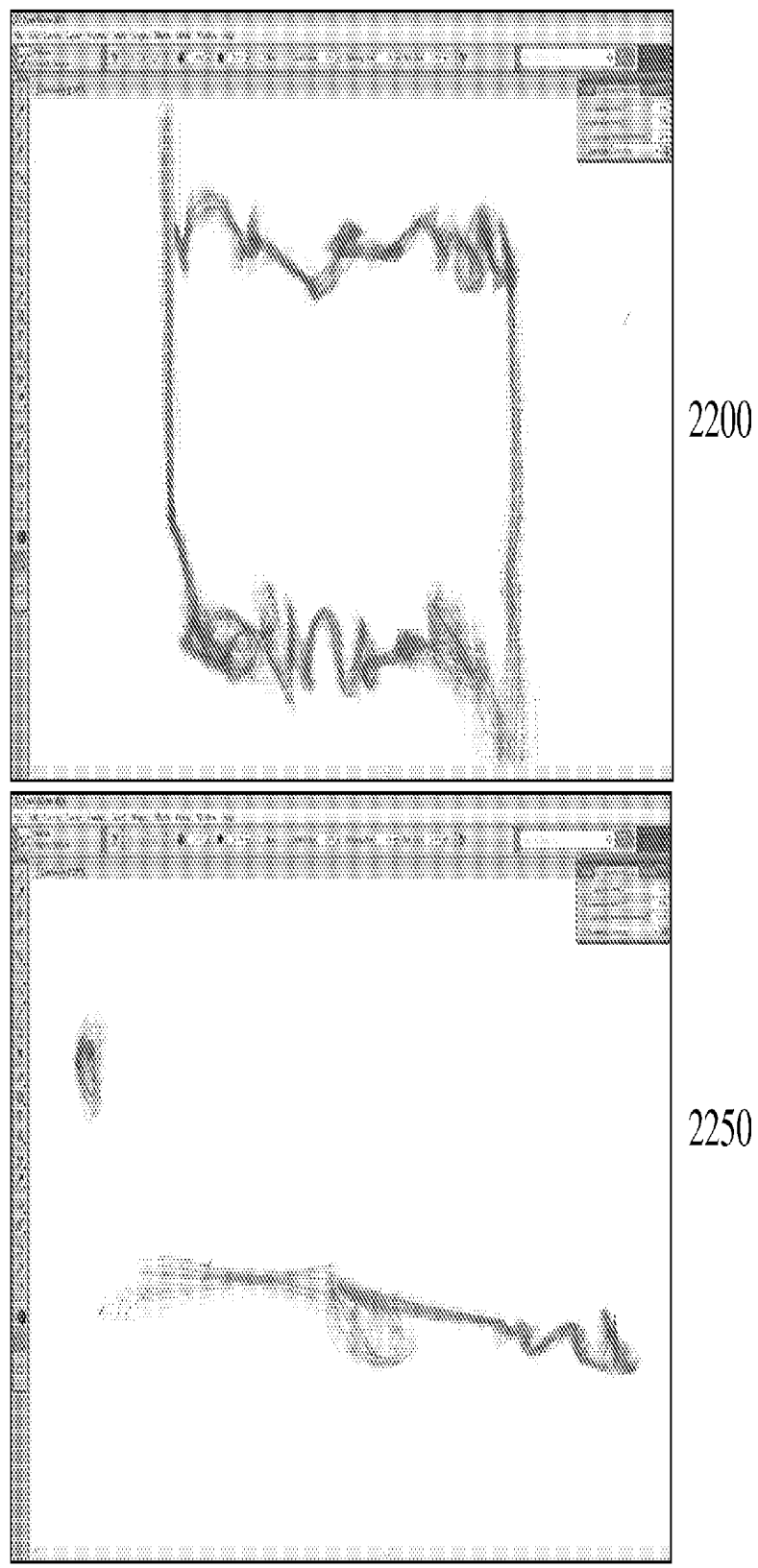
FIG. 22 depicts the effects of global and local chaos upon particle positioning for particles within a ring spring particle mark making tool according to an embodiment of the invention within a digital graphics editor, digital painting, application.

Referring to FIG. 22 there are depicted the effects of global and local chaos upon particle positioning for particles within a ring spring particle mark making tool according to an embodiment of the invention within a GESGEAP. In first image 2200 a gravity particle mark making tool has been configured with the expression of direction against spin rate and the direction angle set to 0°. Accordingly in the horizontal direction the particles within the gravity particle mark making tool spin around the mark making tool stroke whereas in the vertical direction no such spinning is evident. Similarly, setting velocity to spin rate yields second image 2250 wherein at low velocity motion of the mark making tool the spin is "low" yielding larger loops compared to the high velocity motion of the mark making tool wherein the spin is "high" yielding tighter smaller loops. It would be evident to one skilled in the art that the spin as well as other settings associated with the gravity particle menu, e.g. as depicted in second image 600B in FIG. 6, and upper right corners of first and second images 2200 and 2250 respectively, may defined by numerical ranges, figurative ranges (e.g. "low" to "high") or others. Optionally, spin may be subject to an expression such as described supra in respect of other aspects and embodiments of the invention.

Figure 23:
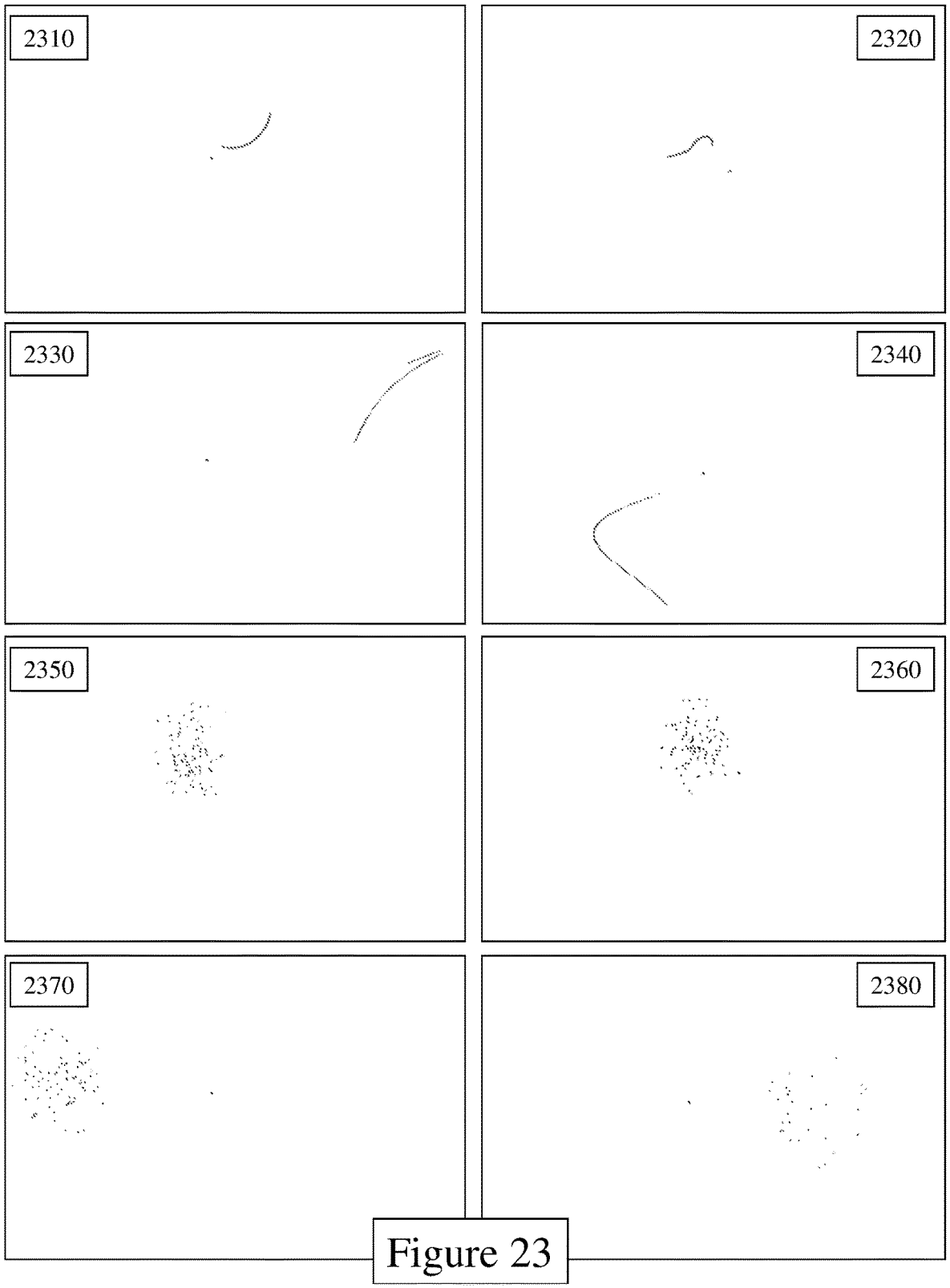
FIG. 23 depicts the effects of global and local chaos upon particle positioning for particles within a particle mark making tool according to an embodiment of the invention within a digital graphics editor, digital painting, application.

Now referring to FIG. 23 there are depicted the effects of global and local chaos upon particle positioning for particles within a particle mark making tool according to an embodiment of the invention within a GESGEAP as captured at initial motion of the mark making tool wherein the particle positions are from marks made with small controller motions between them. According as depicted in first and second images 2310 and 2320 low global chaos and low local chaos results in particle configurations that are similar to one another but as evident from third and fourth images 2330 and 2340 high global chaos with low local chaos results in substantial displacement between the mark making tools but the overall positioning of the particles within each mark making tool impression is ordered due to the low chaos.

Correspondingly as depicted in fifth and sixth images 2350 and 2360 low global chaos and high local chaos results in particle configurations that are centered close to one another but the specific particle distributions are now different and no apparent structure of the mark making tool appears. This is then accentuated as evident from seventh and eighth images 2370 and 2370 where high global chaos with high local chaos results in substantial displacement between the mark making tools and different particle distributions within each mark making tool impression.

Within the descriptions supra in respect of embodiments of the invention particles may be short-lived particles generated at least one of at the initial selection of the mark making tool, at the initial use of the mark making tool, and during use of the mark making tool. Alternatively, the lifetime (or half-life) and rate of renewal of the particles may be set through a setting of the mark making tool. Similarly physical and/or non-physical links between particles, such as springs for example, may be short lived springs generated at least one of at the initial selection of the mark making tool, at the initial use of the mark making tool, and during use of the mark making tool. Alternatively, the lifetime (or half-life) and rate of renewal of the springs may be set through a setting of the mark making tool such that whilst initially bound over the stroke the particles become unbound. Further, such physical and/or non-physical links between particles, such as springs for example, may be connected to the same sub-set of the plurality of particles during the use of the mark making tool or alternatively they may be connected to different sub-sets of the plurality of particles during the use of the mark making tool.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method, comprising:
   receiving, via a user interface, input reflecting an action of a user with a controller controlling a position of a mark making tool within a working area of a graphics application;
   receiving, via another user interface, other input relating to the selection of a flow map to be employed in conjunction with the mark making tool within the working area of the graphics application; and
   generating a plurality of impressions along a path that is defined based on the input, each impression comprising a plurality of particles, wherein
   the positions of each particle of the plurality of particles are determined in dependence upon applying force to each particle of the plurality of particles established from the flow map for a previous position of each particle of the plurality of particles; and
   the flow map is an N-dimensional map defining a spatial variation of a magnitude of the force across the working area of the graphics application.

2. The method of claim 1, wherein
   generating the particle impression for each particle of the plurality of particles further comprises applying a random jitter to a characteristic of the particle;
   the random jitter is applied to an aspect of rendering the particle other than its position; and
   the random jitter has a magnitude determined based on at least one of a selection received via the user interface and an expression associated with the random jitter established by the user.

3. The method of claim 1, wherein
   generating the particle impression for each particle of the plurality of particles further comprises applying a random jitter to a characteristic of the particle;
   the random jitter is applied to an aspect of rendering the particle other than its position; and
   the random jitter has a magnitude determined by at least one of:
   a velocity of a stroke motion with the controller;
   a direction of a stroke motion with the controller;
   a positional aspect of the controller; and
   a pseudorandom value.

4. The method of claim 1, wherein
   the flow map was generated prior to the action of the user with the controller; and
   the flow map either previously existed or was generated upon its selection by the user; and
   the flow map was established in dependence upon at least one of:
   data received from an accelerometer;
   tracked motion of an individual or a predetermined portion of an individual;
   an image;
   an image source;
   an audiovisual source;
   audiovisual content;
   multimedia content;
   a multimedia source;
   biometric data of another individual;
   a pseudo-random number;
   a values retrieved from a database; and
   an environmental parameter.

5. The method of claim 1, wherein
   generating the particle impression for each particle of the plurality of particles further comprises applying a chaos to a characteristic of the particle;
   the chaos is applied to an aspect of rendering the particle other than its geometry; and the chaos is
   a global chaos applied equally to all particles within the plurality of particles of an impression.

6. The method of claim 1, wherein
   initial positions of the plurality of particles are established in dependence upon an expression;
   the action is a stroke motion; and
   the expression varies in dependence upon at least one of:
   a velocity of a stroke motion with the controller;
   a direction of the stroke motion with the controller;
   a pressure applied upon the controller;
   a pressure applied to a surface by the controller during a stroke motion.

7. The method of claim 1, wherein
an initial position of a particle of the plurality of particles depends upon an expression reflecting at least one of:
data received from an accelerometer;
tracked motion;
an image;
an image source;
an audiovisual source;
audiovisual content;
multimedia content;
a multimedia source;
biometric data;
values retrieved from a databases; and
an environmental parameter.

8. The method of claim 1, wherein
at least one of:
rendering a particle path for each particle of the plurality of particles, wherein the particle path is rendered by one of a pattern of points, a series of isolated elements, a mesh, and a mesh fill; and
a lifetime of a particle of the plurality of particles is determined based on a configurable parameter of the mark making tool.

9. The method according to claim 1, wherein
the flow map is a subset of an N-dimensional data set where N is a non-zero positive integer.

10. The method according to claim 1, wherein
the flow map was generated prior to the action of the user with the controller; and
the flow map was established using data relating to one or more aspects of one or more gestures by an individual selected from the group comprising velocity, direction, pressure, location, tilt, bearing, rotation, and a source of the gesture.

11. The method according to claim 1, wherein
the flow map was generated prior to the action of the user with the controller; and
the flow map was established using data derived from one or more axis data associated with tracked motion of one or more objects.

12. The method according to claim 1, wherein
the flow map was generated prior to the action of the user with the controller; and
the flow map was established using data derived from one of an image, an external image source, an image acquired by the graphics application, an external audiovisual source, external audiovisual content, an external multimedia source, external multimedia content, biometric data of the user, and one or more items of environmental data.

13. The method according to claim 1, wherein
the flow map was generated prior to the action of the user with the controller; and
the flow map was established using one or more mathematical formulae.

14. The method according to claim 1, wherein
generating the particle impression for each particle of the plurality of particles further comprises applying a chaos to a characteristic of the particle;
the chaos is applied to an aspect of rendering the particle other than its geometry; and
the chaos is a local chaos applied discretely to each particle of the plurality of particles of the impression.

15. A computing device, comprising:
a memory; and
a processor, coupled to the memory, wherein the processor is configured to:
receive, via a user interface, input reflecting an action of a user with a controller controlling a position of a mark making tool within a working area of a graphics application;
receive, via another user interface, other input relating to the selection of a flow map to be employed in conjunction with the mark making tool within the working area of the graphics application; and
generate a plurality of impressions along a path that is defined based on the input, each impression comprising a plurality of particles, wherein
the positions of each particle of the plurality of particles are determined in dependence upon applying force to each particle of the plurality of particles established from the flow map for a previous position of each particle of the plurality of particles; and
the flow map is an N-dimensional map defining a spatial variation of a magnitude of the force across the working area of the graphics application.

16. The computing device of claim 15, wherein the processor is configured to:
at least one of:
render a particle path for each particle of the plurality of particles, wherein the particle path is rendered by one of a pattern of points, a series of isolated elements, a mesh, and a mesh fill; and
establish a lifetime of a particle of the plurality of particles in dependence upon a configurable parameter of the mark making tool.

17. The method according to claim 15, wherein
the flow map was generated prior to the action of the user with the controller; and
the flow map is a subset of an N-dimensional data set where N is a non-zero positive integer.

18. The method according to claim 15, wherein
the flow map was generated prior to the action of the user with the controller; and
the flow map was established using data relating to one or more aspects of one or more gestures by an individual selected from the group comprising velocity, direction, pressure, location, tilt, bearing, rotation, and a source of the gesture.

19. The method according to claim 15, wherein
the flow map was generated prior to the action of the user with the controller; and
the flow map was established using data derived from one or more axis data associated with tracked motion of one or more objects.

20. The method according to claim 15, wherein
the flow map was generated prior to the action of the user with the controller; and
the flow map was established using data derived from one of an image, an external image source, an image acquired by the graphics application, an external audiovisual source, external audiovisual content, an external multimedia source, external multimedia content, biometric data of the user, and one or more items of environmental data.

21. The method according to claim 15, wherein
the flow map was generated prior to the action of the user with the controller; and
the flow map was established using one or more mathematical formulae.

\* \* \* \* \*